United States Patent [19]

Nakatsuji et al.

[11] Patent Number: 6,045,765
[45] Date of Patent: Apr. 4, 2000

[54] CATALYST AND METHOD FOR CATALYTIC REDUCTION OF NITROGEN OXIDES

[75] Inventors: Tadao Nakatsuji; Ritsu Yasukawa; Keiichi Tabata; Kazuyuki Ueda, all of Sakai, Japan

[73] Assignees: Sakai Chemical Industry Co., Ltd.; Petroleum Energy Center, both of Japan

[21] Appl. No.: 08/796,884

[22] Filed: Feb. 7, 1997

[30] Foreign Application Priority Data

| Feb. 8, 1996 | [JP] | Japan | 8-022323 |
| Nov. 22, 1996 | [JP] | Japan | 8-312058 |
| Jan. 24, 1997 | [JP] | Japan | 9-011508 |

[51] Int. Cl.$^7$ .................................................. B01D 53/56
[52] U.S. Cl. .................................................. 423/239.1
[58] Field of Search ........................ 423/212, 213.2, 423/213.5, 213.7, 235, 239.1; 502/347, 344, 326, 325

[56] References Cited

U.S. PATENT DOCUMENTS

| 3,565,828 | 2/1971 | Kucirka. | |
| 4,092,372 | 5/1978 | Furuoya et al.. | |
| 5,534,237 | 7/1996 | Yoshida et al. | 423/239.1 |
| 5,589,432 | 12/1996 | Yoshida et al. | 502/325 |
| 5,658,543 | 8/1997 | Yoshida et al. | 423/213.2 |
| 5,670,443 | 9/1997 | Irite et al. | 502/330 |
| 5,670,444 | 9/1997 | Yoshida et al. | 502/331 |
| 5,714,130 | 2/1998 | Saito et al. | 423/239.1 |
| 5,714,432 | 2/1998 | Yoshida et al. | 502/415 |
| 5,744,111 | 4/1998 | Muramatsu et al. | 423/235 |
| 5,744,112 | 4/1998 | Irite et al. | 423/236 |

FOREIGN PATENT DOCUMENTS 0 676 232  10/1995  European Pat. Off. .

OTHER PUBLICATIONS

*Database WPI*, Section Ch, Week 8624, abstract No. 86–153118 (abstract of JP 61–086944) (May 1986).
*Database WPI*, Section Ch, Week 9049, abstract No. 90–364434 (abstract of JP 2–261511) (Oct. 1990).
*Databse WPI*, Section Ch, Week 9249, abstract No. 92–402137 (abstract of JP 4–298235) (Oct. 1992).

*Primary Examiner*—Tom Dunn
*Attorney, Agent, or Firm*—Wenderoth, Lind & Ponack, L.L.P.

[57] ABSTRACT

The invention provides a catalyst for catalytic reduction of nitrogen oxides which uses a hydrocarbon or an oxygen-containing organic compound as a reducing agent, which comprises silver aluminate supported on a solid acid carrier material. The invention also provides a catalyst which comprises silver aluminate and at least one transition element selected from the group consisting of W, Mo and V, each supported on a solid acid carrier material. The invention further provides a method for producing such catalysts and a method for catalytic reduction of nitrogen oxides by use of such catalysts as above mentioned.

17 Claims, 7 Drawing Sheets

CATALYST AND METHOD FOR CATALYTIC REDUCTION OF NITROGEN OXIDES

FIELD OF THE INVENTION

This invention relates to a catalyst and a method for catalytic reduction of nitrogen oxides. More particularly, the invention relates to a catalyst and a method for catalytic reduction of nitrogen oxides using a hydrocarbon and/or an oxygen-containing organic compound as a reducing agent, suitable for reducing and removing harmful nitrogen oxides contained in exhaust or waste gases from factories or automobiles. The invention further relates to a method for producing such a catalyst.

The invention also relates to a method for producing a catalyst for catalytic reduction of nitrogen oxides which comprises silver aluminate supported on alumina.

The invention further relates to a catalyst structure suitable for catalytic reduction of nitrogen oxides, which is composed of a support structure and the catalyst supported thereon or therein.

Nitrogen oxides contained in exhaust gases have been removed by, for example, a method in which the nitrogen oxides are oxidized and then absorbed in an alkali or a method in which the nitrogen oxides are reduced to nitrogen by using ammonia, hydrogen, carbon monoxide or hydrocarbons as a reducing agent.

These conventional methods have their own disadvantages. That is, the former method requires a means for handling the resulting alkaline waste liquid to prevent environmental pollution. The latter method, when it uses ammonia as a reducing agent, involves the problem that ammonia reacts with sulfur oxides in the exhaust gases to form salts, resulting in a reduction in catalytic activity. When the latter method uses hydrogen, carbon monoxide or hydrocarbons as a reducing agent, the reducing agent preferentially reacts with oxygen because the exhaust gas contains oxygen in a higher concentration than nitrogen oxides. This means that substantial reduction of nitrogen oxides requires a large quantity of the reducing agent.

It has recently been proposed to catalytically decompose nitrogen oxides in the absence of a reducing agent. However, known catalysts for direct decomposition of nitrogen oxides have not yet been put to practical use due to their low decomposing activity.

On the other hand, a variety of zeolites have been proposed as a catalyst for catalytic reduction of nitrogen oxides using a hydrocarbon or an oxygen-containing organic compound as a reducing agent. In particular, Cu-ion exchanged ZSM-5 or H type (acid type) zeolite ZSM-5 ($SiO_2/Al_2O_3$ molar ratio=30 to 40) are regarded optimal. However, it has been proved that even the H type zeolite ZSM-5 has not sufficient reducing activity. In particular, the zeolite catalyst is deactivated promptly on account of dealuminum of aluminum of zeolite structure when water is contained in the exhaust gas. Under these circumstances, it has been demanded to develop a more highly active catalyst for catalytic reduction of nitrogen oxides.

Accordingly, a catalyst composed of an inorganic oxide carrier material having silver or silver oxide supported thereon is proposed, as described in Japanese Patent Application Laid-open No. 5-317647. However, it has been proved that the catalyst has high activity for oxidation whereas it has low selective reactivity to nitrogen oxides, so that the catalyst has low conversion rate of nitrogen oxides to nitrogen. In addition, the catalyst involves the problem that it is deactivated promptly in the presence of sulfur oxides, but also it often needs high reaction temperatures when being used in the presence of sulfur oxides notwithstanding it has not a sufficient resistance to heat. Thus, it has been demanded to develop a more highly heat-resistant catalyst for catalytic reduction of nitrogen oxides.

SUMMARY OF THE INVENTION

It is an object of the invention to provide a catalyst for catalytic reduction of nitrogen oxides to nitrogen using a hydrocarbon or an oxygen-containing organic compound as a reducing agent, which selectively catalyzes a reaction of nitrogen oxides with the reducing agent even in the presence of oxygen, sulfur oxides and water so that nitrogen oxides in the exhaust gases can be reduced efficiently without requiring a large quantity of the reducing agent, and which is highly durable even in the presence of water and at high reaction temperatures.

It is a further object of the invention to provide a highly durable catalyst for catalytic reduction of nitrogen oxides to nitrogen which does not need high reaction temperatures even in the presence of sulfur oxides.

It is still an object of the invention to provide a catalyst structure for catalytic reduction of nitrogen oxides, which is composed of a support structure and the above mentioned catalyst supported thereon or therein.

The invention provides a first catalyst (CATALYST I) for catalytic reduction of nitrogen oxides which uses a hydrocarbon or an oxygen-containing organic compound as a reducing agent, which comprises silver aluminate supported on a solid acid carrier material.

Furthermore, the invention provides a second catalyst (CATALYST II) for catalytic reduction of nitrogen oxides which uses a hydrocarbon or an oxygen-containing organic compound as a reducing agent, which comprises silver aluminate and at least one transition element selected from the group consisting of W, Mo and V, each supported on a solid acid carrier material, wherein the silver aluminate is contained in an amount of 0.01–10% by weight in terms of silver (Ag) and the at least one transition element in an amount of 0.0001–0.2% by weight, each based on the catalyst.

The invention provides a method for catalytic reduction of nitrogen oxides contained in exhaust gases which comprises contacting the exhaust gas with the above defined first or second catalysts in the presence of a hydrocarbon or an oxygen-containing organic compound as a reducing agent.

The invention also provides a more efficient method for catalytic reduction of nitrogen oxides contained in exhaust or waste gases by use of such a catalyst which comprises silver aluminate supported on a solid acid carrier material as above mentioned.

A first method (METHOD I) for catalytic reduction of nitrogen oxides contained in exhaust gases according to the invention comprises:

a first step in which the exhaust gas is contacted with a catalyst which comprises silver aluminate in the presence of a hydrocarbon as a reducing agent; and a second step in which the exhaust gas is contacted with a catalyst which comprises at least one of alumina, silica-alumina, zirconia and titania.

A second method (METHOD II) for catalytic reduction of nitrogen oxides contained in exhaust gases according to the invention comprises:

a first step in which the exhaust gas is contacted with a catalyst which comprises at least one member selected from the group consisting of phosphoric acid, phosphates, chlorides and sulfates of the Ib elements, VIIa elements and VIII elements of the periodic table; and a second step in which the exhaust gas is contacted with a catalyst which comprises silver aluminate.

The invention further provides a method for producing a catalyst which comprises silver aluminate supported on alumina.

A first method for producing a catalyst for reducing nitrogen oxides to nitrogen which comprises silver aluminate supported on alumina, comprises supporting at least one member selected from the group consisting of silver, silver halides, silver nitrate, silver hydroxide and silver oxide on alumina, and then calcining the resultant product in an oxidative atmosphere in the presence of water vapor at a temperature of 600–900° C. to form silver aluminate on the alumina.

A second method comprises adding an alkali to an aqueous solution of a mixture of a water soluble aluminum compound and a water soluble silver compound to form coprecipitates, drying the coprecipitate, and calcining the coprecipitate in an oxidative atmosphere in the presence of water vapor at a temperature of 600–900° C. to form silver aluminate supported on the resulting alumina.

A third method comprises adding an alkali to an aqueous solution of a mixture of a water soluble aluminum compound and a water soluble silver compound in the presence of halide ions to form coprecipitates, drying the coprecipitate, and calcining the coprecipitate in an oxidative atmosphere in the presence of water vapor at a temperature of 600–900° C. to form silver aluminate supported on the resulting alumina.

DETAILED DESCRIPTION OF THE INVENTION

CATALYSTS I AND II

Figure 1:
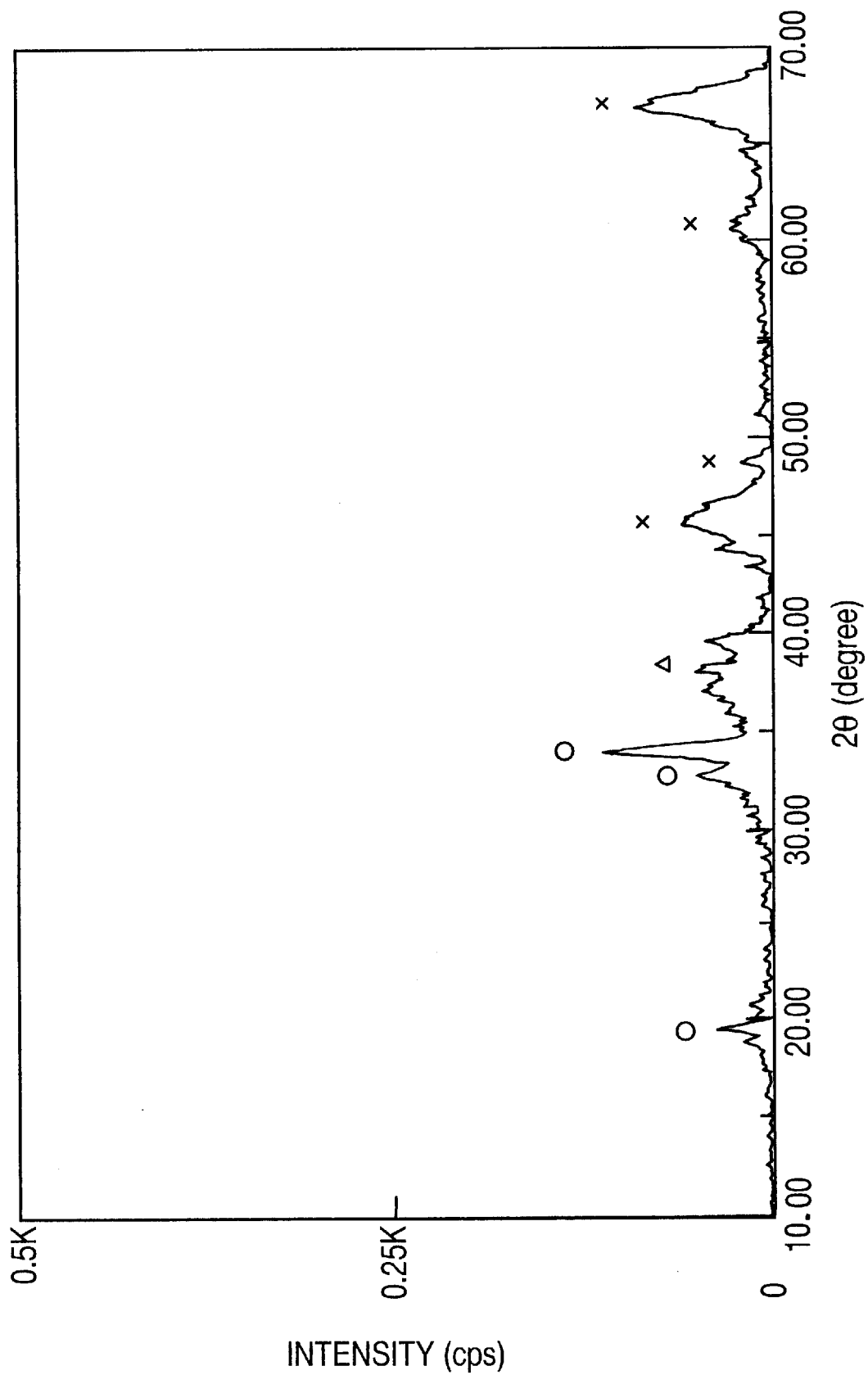
FIG. 1 shows an X-ray diffraction pattern of a catalyst composed of silver aluminate supported on γ-alumina which was prepared by calcining silver chloride supporting γ-alumina at a temperature of 800° C. in an oxidative atmosphere in the presence of water vapor.

The solid acid carrier material used in the catalyst of the invention means a carrier material which is solid and acidic at a temperature at which the catalyst is used. Solid acidity can be confirmed by a release method at elevated temperatures using ammonia or an in situ FTIR (Fourier Transform Infrared Spectroscopy) method using ammonia or pyridine. The solid acid carrier material which is usable in the invention includes oxide type solid acid carrier materials and zeolite type solid acid carrier materials.

The oxide type solid acid carrier material includes single metal oxides, such as $Al_2O_3$, $TiO_2$, $TiO_2/SO_4^{2-}$, $ZrO_2$ or $ZrO/SO_4^{2-}$, and composite oxides, such as $SiO_2/Al_2O_3$, $TiO_2/Al_2O_3$ or $TiO_2/ZrO_2$. From the standpoint of heat resistance, $Al_2O_3$, $ZrO_2$ or $SiO_2/Al_2O_3$ is preferred.

In turn, the zeolite type solid acid carrier material is obtained preferably by treating heat resistant zeolites, such as Na-mordenite, Na-ZSM-5, Na-USY (utrastable Y-type zeolite), or retallosilicates (zeolites whose aluminum is partly or wholly replaced with another metallic element, especially Fe, Ga, Zn, La, Cu, Mo, Cr, Ge, Ti or B), with an aqueous solution of ammonium salt (e.g., ammonium sulfate) or an acid (e.g., sulfuric acid) to exchange a part or the whole of the alkali metal of the zeolite for an ammonium ion or a hydrogen ion. In the case where the alkali metal is exchanged for an ammonium ion, the product finally requires calcining.

A first example of the zeolite type solid acid carrier material includes an acid type mordenite which is obtained by acid treatment of a mordenite type zeolite having the formula (I)

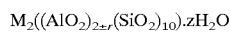

$$M_2((AlO_2)_{2\pm r}(SiO_2)_{10}) \cdot zH_2O$$

wherein M represents an alkali metal ion and r is a value subject to variation depending on the conditions of zeolite synthesis, and which has a $SiO_2/Al_2O_3$ molar ratio of 13–20 and a $SiO_2/H_2O$ molar ratio of 25–200.

A second example of the zeolite type solid acid carrier material includes a zeolite which is obtained by exchanging a part or the whole of ion M' of zeolite having the formula (II)

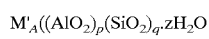

$$M'_A((AlO_2)_p(SiO_2)_q \cdot zH_2O$$

wherein M' represents an alkali metal ion, an alkaline earth metal ion or a hydrogen ion; nA=p (wherein n is a valence number of ion M'); and q/p is 5 or more, for a lanthanum ion ($La^{3+}$), a gallium ion ($Ga^{3+}$), a cerium ion ($Ce^{4+}$), a titanium ion ($Ti^{4+}$), a zirconium ion ($Zr^{4+}$) or a tin ion ($Sn^{4+}$).

Usable solid acid carrier materials further include crystalline aluminum phosphate (ALPO) having a zeolite-like porous structure or lamellar structure and its analogues, i.e., crystalline aluminum silicate phosphate (SAPO), and crystalline metal aluminum phosphate (MAPO) which is obtained by displacing a part of phosphorous or phosphorous-aluminum of ALPO with a metal, such as Ti, Fe, Mg, Zn, Mn or Co.

The ALPO type phosphate can be prepared by a hydrothermal process using a combination of a raw material comprising the above mentioned phosphorous source and metal source with an appropriate component selected from silica, silica sol, sodium silicate and the like, mixed with a so-called template, e.g., an amine or a quaternary ammonium compound. The reaction conditions for the ALPO type phosphate are similar to zeolite synthesis, with a main difference therebetween which consists in that the former is synthesized in an acidic condition at higher temperature, usually 150° C. or more than the latter is synthesized.

The composition of the ALPO type phosphate is generally represented by $Al_2O_3 \cdot (0.8-1.2)P_2O_5 \cdot nH_2O$. In SAPO or MAPO, the amount of phosphorous and/or aluminum to be displaced with silica or a metal is about 1/10 the total amount of phosphorous and aluminum at the highest. SAPO or MAPO whose silica or metal content is out of this range, i.e., those containing an amorphous substance may also be employed in the invention.

Where an ALPO type phosphate prepared by a hydrothermal proces is used as a carrier material, the synthetis product is usually washed with water, dried, and calcined in air to remove the remaining template.

Among the above mentioned solid acid carrier materials, alumina is most preferred since not only it is highly durable at high temperatures, but also it has excellent carrying effect of silver aluminate. In particular, there is preferred alumina which has an alkali metal and alkaline earth metal content of less than 0.5% by weight, a pore volume of pores of less than 60 Å in diameter of more than 0.06 $cm^3/g$, and a pore volume of pores of less than 80 Å in diameter of more than 0.1 $cm^3/g$, as described in Japanese Patent Application Laid-open No. 7-171347. The porous alumina which has such pore volumes as above accelerates the appropriate oxidation of a reducing agent, and it acts in concert with silver aluminate supported thereon to catalytically reduce nitrogen oxides efficiently.

According to the invention, there is provided a method for producing the above described first catalyst (CATALYST I) or a catalyst comprising silver aluminate supported on alumina, although the first catalyst may be prepared otherwise.

A first method for producing a catalyst for reducing nitrogen oxides to nitrogen which comprises silver aluminate supported on alumina, comprises supporting at least one member selected from the group consisting of silver, silver halides, silver nitrate, silver hydroxide and silver oxide on alumina, and then calcining the resultant product in an oxidative atmosphere in the presence of water vapor at a temperature of 600–900° C. to form silver aluminate on the alumina.

A second method comprises adding an alkali to an aqueous solution of a mixture of a water soluble aluminum compound and a water soluble silver compound to form coprecipitates, drying the coprecipitate, and calcining the coprecipitate in an oxidative atmosphere in the presence of water vapor at a temperature of 600–900° C. to form silver aluminate supported on the resulting alumina.

A third method comprises adding an alkali to an aqueous solution of a mixture of a water soluble aluminum compound and a water soluble silver compound in the presence of halide ions to form coprecipitates, drying the coprecipitate, and calcining the coprecipitate in an oxidative atmosphere in the presence of water vapor at a temperature of 600–900° C. to form silver aluminate supported on the resulting alumina.

In the first method, silver chloride is preferred as a silver halide although silver bromide or iodide may also be used, if necessary.

In the second or third method, aluminum nitrate is preferred as the water soluble aluminum compound, whereas silver nitrate is preferred as the water soluble silver compound. Ammonia is preferred as the alkali, although others may also be used, if necessary. The solution is usually adjusted at a pH of 6–8 by the alkali to form coprecipitates of aluminum hydroxide and silver hydroxide or oxide. When the alkali is added to the solution in the presence of halide ions, such as chloride ions, there is formed coprecipitates of aluminum hydroxide and silver halides.

In either methods, the calcining temperature is preferably in the range of 700–800° C. The oxidative atmosphere contains water vapor in an amount of 3–20% by weight, preferably in an amount of 5–15% by weight, so that silver aluminate is efficiently produced. When the calcining temperature is less than about 400° C., there is produced substantially no silver aluminate. When the calcining temperature is about 500° C., there is formed silver aluminate only in a slight amount on alumina. According to the invention, the calcining temperature of 600–900° C. permits the formation of silver aluminate in a sufficient amount on alumina which is useful as a reducing catalyst for nitrogen oxides. Preferred calcining temperature is in the range of 700–800° C. The use of calcining temperature of more than 900° C. is not desirable because silver metal is apt to be formed on alumina.

In more detail, the first catalyst of the invention which comprises silver aluminate supported on a solid acid carrier material may be prepared by any one of the following methods (A) to (D).

Method (A)

An aqueous slurry of a solid acid is prepared. A water soluble salt of silver such as silver nitrate is added to the slurry to fix silver ions at ion exchange sites of the solid acid while the slurry is maintained at a pH around 8.0 where silver hydroxide is not formed. When alumina is employed as the solid acid by way of example, the alumina having silver ion fixed thereon is immersed in an aqueous solution which contains chloride ions in an amount sufficient to react with the silver ion, e.g., a hydrochloric acid solution, thereby to form silver chloride on the alumina. Then the alumina is washed with water to remove excess chloride ions therefrom, to provide a solid acid catalyst which supports silver chloride thereon.

The resulting product is then calcined in an oxidative atmosphere such as in air preferably in the presence of steam at a temperature of 600–900° C., preferably at a temperature of 700–800° C., to form silver aluminate on the alumina, resulting in a powdery solid acid catalyst which supports silver aluminate thereon.

As a simple method, silver nitrate is supported on alumina, and the product is calcined in an oxidative atmosphere such as in air preferably in the presence of steam at a temperature of 600–900° C., preferably at a temperature of 700–800° C., to form silver aluminate on the alumina, resulting in a powdery solid acid catalyst which supports silver aluminate thereon.

Method (B)

An aqueous solution of a water soluble salt as a precursor of a solid acid such as aluminum nitrate and a water soluble silver salt such as silver nitrate is prepared. The solution is neutralized in the presence of chloride ions to form precipitates. The precipitate is collected by filtration, washed with water and then repulped. After repeating these operations, the precipitate is dried and calcined to form a solid acid which supports silver chloride thereon.

The resulting product is then calcined in an oxidative atmosphere such as in air preferably in the presence of steam at a temperature of 600–900° C., preferably at a temperature of 700–800° C., to form silver aluminate thereon, resulting in a powdery solid acid catalyst which supports silver aluminate thereon.

Method (C)

An aqueous solution of a water soluble aluminum salt such as aluminum nitrate and a water soluble silver salt such as silver nitrate is prepared. Alumina, preferably hydrated alumina, is immersed in the solution to impregnate the alumina with the aluminum salt and silver salt. The alumina is then dried by a suitable means, for example, the alumina is spray-dried.

The resulting product is then calcined in an oxidative atmosphere such as in air preferably in the presence of steam at a temperature of 600–900° C., preferably at a temperature of 700–800° C., to form silver aluminate thereon, resulting in a powdery solid acid catalyst which supports silver aluminate thereon.

Method (D)

An alkali metal salt of alminic acid, such as sodium aluminate, and an aqueous solution of from one to four equivalents of silver nitrate per equivalent of the aluminate are mixed and dried at the same time by a spray drying process. The resulting particles are melted together in the absence of water at a temperature of 300–800° C. to form silver aluminate. The product is then washed with water to remove excess silver nitrate and sodium nitrate to provide high purity silver aluminate. The silver aluminate is wet mixed with a solid acid such as alumina and the mixture is pulverized with a ball mill, for example, followed by drying, to provide a catalyst in the form of powder composed of alumina which supports silver aluminate thereon.

The second catalyst (CATALYST II) of the invention which comprises silver aluminate and at least one element of W, Mo and V may be prepared by any one of the following methods (A') to (D') in the same manner as the methods (A) to (D)

Method (A')

The powdery solid acid catalyst which supports silver aluminate thereon is prepared by the method (A). The catalyst is then immersed in an aqueous solution of a water soluble compound of the transition element to support the transition element on the catalyst. As another method, the powdery solid acid catalyst is mixed with an aqueous solution of a water soluble compound of the transition element, and the mixture is evaporated to dryness.

The resulting product is then calcined in the presence of water vapor in an oxidative atmosphere (e.g., in air) at a temperature of 300–900° C., preferably at a temperature of 400–800° C.

Method (B')

The powdery solid acid catalyst which supports silver aluminate thereon is prepared by the method (B'). The transition element is then supported on the catalyst in the same manner as in the method (A').

Method (C')

An aqueous solution of a water soluble aluminum salt such as aluminum nitrate, a water soluble silver salt such as silver nitrate and a water soluble compound of the transition element is prepared. Alumina, preferably hydrated alumina, is immersed in the solution to impregnate the alumina with the aluminum salt, the silver salt and the compound of the transition element. The alumina is then dried by a suitable means, for example, the alumina is spray-dried.

The resulting product is then calcined in an oxidative atmosphere such as in air preferably in the presence of steam at a temperature of 600–900° C., preferably at a temperature of 700–800° C., so that silver aluminate is formed, resulting in a powdery solid acid catalyst which supports silver aluminate and the transition element thereon.

Method (D')

The catalyst in the form of powder composed of alumina which supports silver aluminate thereon is prepared by the method (D). The transition element is then supported on the catalyst in the same manner as in the method (A').

In the second catalyst, the transition element is supported in the form more oxides on a solid acid carrier material.

The first catalyst of the invention contains silver aluminate in an amount of 0.01–10% by weight in terms of silver based on the total of the solid acid carrier material and the silver aluminate supported thereon. When the amount of silver aluminate in the catalyst is tore than 10% by weight in terms of silver, the resulting catalyst has an excessive oxidation power so that it is insufficient in selectivity of catalytic reaction, whereas when the amount of silver aluminate in the catalyst is less than 0.01% by weight in terms of silver, the resulting catalyst has an insufficient activity in the catalytic reaction. It is in particular preferred that the first catalyst contains silver aluminate in an amount of 0.1–5% by weight in terms of silver, since the use of this catalyst permits the catalytic reduction reaction of nitrogen oxides to proceed with the least dependence on space velocity.

The first catalyst of the invention contains silver aluminate in an amount as above mentioned. Thus, it has a moderate oxidation power, compared with a solid acidcatalyst which has silver oxide or silver metal supported on a solid acid carrier material. The catalyst accelerates the partial oxidation or cracking of a hydrocarbon used as a reducing agent. As results, the catalyst has a very high activity and selectivity in the catalytic reduction of nitrogen oxides. The catalyst also has a very high activity and selectivity in the catalytic reduction of nitrogen oxides when an oxygen-containing organic compound is used as a reducing agent. In addition, the catalyst of the invention is excellent in resistance to sulfur oxides as well as resistance to heat, and it is suitable for use as a catalyst for reduction of nitrogen oxides or for denitrizing exhaust gases from diesel engines or for denitrizing automobile exhaust gases from lean gasoline engines.

The second catalyst of the invention contains at least one transition element selected from the group consisting of W, Mo and V usually in the form of oxides in addition to silver aluminate supported on a solid acid carrier material. The catalyst contains silver aluminate in an amount of 0.01–10% by weight in terms of silver, as set forth hereinbefore, and the transition elements in an amount of 0.0001–0.2% by weight in terms of metal, based on the total amount of the solid acid carrier, silver aluminate and the transition elements. When the amount of the transition elements is more than 0.2% by weight in terms of metal, the resulting catalyst has an excessive oxidation power so that it is insufficient in selectivity of catalytic reaction, whereas when the amount of the transition elements is less than 0.0001% by weight in terms of metal, the resulting catalyst is little improved compared with the first single component catalyst.

It is in particular preferred that the second catalyst contains silver aluminate in an amount of 0.1–5% by weight in terms of silver and the at least one transition element in an amount of 0.0005–0.1% by weight in terms of metal.

The catalyst of the invention, the first or second, may be obtained in various shapes such as powder or particles. Accordingly, the catalyst may be per se molded into various shapes such as honeycomb, annular or spherical shapes by any of well known methods. If desired, appropriate additives, such as molding assistants, reinforcements, inorganic fibers or organic binders may be used when the catalyst is molded.

The catalyst of the invention may be advantageously applied onto an inactive substrate of any desired shape by, for example, a wash coat method, to provide a catalyst structure which has a layer of the catalyst on the surface of the catalyst structure. The inactive substrate may be composed of, for example, clay mineral such as cordierite or a metal such as stainless steel, preferably of heat-resistant, such as a Fe-Cr-Al steel, and may be in the form of honeycomb, annular or spherical structures.

It is especially preferred that the catalyst is contained in the surface layer of the catalyst structure of not less than 30 μm in depth from the surface of the catalyst structure so that the resulting catalyst structure is highly selective, and hence highly active in the catalytic reduction of nitrogen oxides. The depth or thickness of the catalyst layer is usually up to 300 μm. If the catalyst layer is more than 300 μm in thickness, the catalyst structure has no corresponding improvement in selectivity. Furthermore, it is not desirable from the standpoint of production cost to form such a thick layer of catalyst.

In turn, the catalyst of the invention may per se be shaped into a catalyst structure of, for example, honeycomb, annular or spherical forms. By way of example, a mixture of γ-alumina, an aqueous solution of a water soluble salt of silver such as silver nitrate and an organic binder is prepared, kneaded and formed into a honeycomb structure. The honeycomb structure is then dried and calcined to provide a honeycomb structure composed of γ-alumina supporting silver (and/or silver oxide) therein. The honeycomb structure is then treated with hydrochloric acid to provide a honeycomb structure supporting silver chloride thereon. The honeycomb structure is then heated and calcined in air in the presence of water to provide a catalyst structure in the form of honeycomb which supports silver aluminate thereon.

Alternatively, a catalyst in the form of powder which is composed of γ-alumina and silver aluminate supported thereon is first prepared, and the catalyst may be shaped into a honeycomb structure.

These catalyst structures in the form of honeycomb prepared as above mentioned contains γ-alumina and silver aluminate in the same concentration throughout the structure. Accordingly, it is preferred that the honeycomb structure has walls of not less than 60 μm thick so that the catalyst is contained in a layer of not less than 30 μm in depth from either surface of the walls of the catalyst structure.

The second catalyst of the invention may also per se be formed into a catalyst structure such as a honeycomb structure in the same manner as above described.

The hydrocarbon which is used as a reducing agent in the invention includes gases, such as methane, ethane, propane, butane, ethylene, propylene, isobutylene, 1-butene or 2-butene; and liquids, such as single component hydrocarbons, e.g., pentane, hexane, heptene, octane, benzene, toluene or xylene, and petroleum hydrocarbons, e.g., gasoline, kerosine, light oil or heavy oil. Preferred of them are lower alkanes such as methane, ethane, propane or butane; lower alkenes such as ethylene, propylene, isobutylene, 1-buyene or 2-butene; or gas oil. The hydrocarbon may be used singly or as a mixture of two or more.

The terminology "oxygen-containing organic compound" as used herein for a reducing agent means an organic compound having at least one oxygen atoms in the molecule thereof. Specific examples of the oxygen-containing organic compound include aldehydes such as formaldehyde or acetaldehyde; alcohols such as methanol, ethanol, propanol or octanol; ethers such as dimethyl ether, diethyl ether or dipropyl ether; esters such as methyl acetate, ethyl acetateor fats and oils; and ketones such as acetone, methyl ethyl ketone or methyl isobutyl ketone. The oxygen-containing organic compound may be used singly or as a mixture of two or more. When the second catalyst is used, aldehydes are preferred as a reducing agent.

The hydrocarbon and oxygen-containing organic compound may be used in combination.

The amount of the reducing agent used, though varying depending on the individual hydrocarbon or oxygen-containing organic compound used, is usually from about 0.1 to 2 mols per mol of nitrogen oxides. When the molar ratio of the reducing agent to nitrogen oxides is less than 0.1, the catalyst has no sufficient reducing activity. On the other hand, when the molar ratio is more than 2, the amount of the reducing agent which is unreacted and discharged increases, and post treatment for recovery of the unreacted reducing agent is needed.

Uncombusted matters or incomplete combustion products of fuels in exhaust gases, that is, hydrocarbons or particulates matters are also effective as a reducing agent, and accordingly, included in the term of "hydrocarbons" as used herein. In other words, the catalyst of the invention is deemed useful for removal or reduction of the hydrocarbons or particulates matters contained in exhaust gases.

The temperature at which the hydrocarbon selectively reduces nitrogen oxides ascends in the order of alkynes, alkenes, aromatic hydrocarbons and alkanes. The greater the number of the carbon atoms the reducing agent has, the lower the effective temperature.

A suitable temperature for the catalyst of the invention to have effective activity in reduction of nitrogen oxides usually in the range of 100–800° C., preferably in the range of 200–500° C., though varying depending on the individual reducing agents used. Within the above recited temperature range, exhaust gases are preferably treated at a space velocity of 500–100000 hr$^{-1}$.

METHOD I

As hereinbefore set forth, a catalyst composed of silver or silver oxide supported on an inorganic oxide is already known. However, the catalytic reduction of nitrogen oxides by use of an oxygen-containing compound as a reducing agent in the presence of the catalyst by-produces nitrogen-containing compounds such as ammonia, amines or hydrogen cyanide. These nitrogen-containing compounds are very toxic, and in addition, they may newly produce nitrogen oxides. The by-production of the nitrogen-containing compounds thus reduces the conversion rate of nitrogen oxides to nitrogen.

Under these circumstances, there is proposed a method in which exhaust gases are first contacted with silver or silver oxide supported on an inorganic oxide and is then contacted with a catalyst which comprises tungsten or vanadium, as disclosed in Japanese Patent Application Laid-open No, 7-60119. However, this method is proved to be still insufficient in conversion rate of nitrogen oxides to nitrogen.

Furthermore, the known silver or silver oxide catalyst needs temperatures as high as in the range of 450–600° C. for the catalyst to be practically active in the catalytic reduction of nitrogen oxides.

The invention provides a method for reducing nitrogen oxides to nitrogen in a stable and efficient manner by use of a reduced amount of a hydrocarbon as a reducing agent even in the presence of sulfur oxides and water in exhaust gases and without undesirable by-production of toxic nitrogen-containing compounds.

Preferred methods for catalytic reduction of nitrogen oxides contained in exhaust gases by use of the catalyst which comprises silver aluminate supported on a solid acid carrier material will now be described.

The first method (METHOD I) of the invention for catalytic reduction of nitrogen oxides contained in exhaust gases comprises:

a first step in which the exhaust gas is contacted with a first catalyst which comprises silver aluminate supported on a solid acid carrier material in the presence of a hydrocarbon as a reducing agent; and a second step in which the exhaust gas is contacted with a second catalyst which comprises at least one of alumina, silica-alumina, zirconia and titania.

The first catalyst used in the first step in this method is the CATALYST I or II described hereinbefore. It is preferred that the catalyst is composed of silver aluminate supported on alumina (CATALYST I).

In the first step, the exhaust gas is contacted with the first catalyst usually at a space velocity of 5000–50000 hr$^{-1}$. In order to achieve high conversion of nitrogen oxides to nitrogen, it is generally desirable to employ a small space velocity, however, the above range of space velocity is usually employed from the practical standpoint. The reaction temperature in the first step is usually in the range of 250–550° C.

Hydrocarbons are used as a reducing agent. The amount of the reducing agent is usually from about 0.1 to 2 mols per mol of nitrogen oxides, as set forth hereinbefore.

In the first step, the exhaust gas is contacted with the first catalyst in the presence of a hydrocarbon so that the hydrocarbon is selectively reacted with nitrogen oxides so that the nitrogen oxide is converted to nitrogen and nitrogen-containing compounds. The thus formed nitrogen-containing compound is then catalytically converted to nitrogen in the presence of the second catalyst in the second step.

The second catalyst used in the second step is at least one of alumina, silica-alumina, zirconia and titania. These oxides are solid acids, as hereinbefore described, and as well known, they have been used as carrier materials for various catalysts. According to the invention, however, the oxides are used as a specific catalyst in the second step. The oxides may be prepared by any known method. By way of example, a hydroxide is first prepared by a hydrolysis by neutralization method, a hydrolysis by heating method, or a sol-gel method, and then the hydroxide is thermally decomposed to an oxide. It is preferred that the oxide used has a large surface area.

Among the above oxides, alumina or zirconia is in particular preferred as the second catalyst in the second step, and the same alumina as used as the carrier material for the catalyst in the first step is most preferred.

In the second step, the exhaust gas is contacted with the second catalyst usually at a space velocity of 5000–100000 hr$^{-1}$. Since the nitrogen-containing compounds are decomposed at a large reaction rate in the second step, a larger space velocity may be employed than that in the first step. The reaction temperature in the second step is usually in the range of 250–550° C.

According to the method as above described, the exhaust gas which contains nitrogen oxides is contacted with the first catalyst in the first step in the presence of a hydrocarbon so that the hydrocarbon is selectively reacted with nitrogen oxides to convert the nitrogen oxides to nitrogen and nitrogen-containing compounds, and the nitrogen-containing compounds are then converted to nitrogen in the second step by use of the second catalyst. Accordingly, the method makes it possible to catalytically reduce nitrogen oxides in the exhaust gas in a stable and efficient manner without the use of a large quantity of reducing agent and without undesirable by-production of toxic nitrogen-containing compounds such as ammonia, amines or hydrogen cyanide.

METHOD II

The second method of the invention for catalytic reduction of nitrogen oxides contained in exhaust gases comprises:

a first step in which the exhaust gas is contacted with a first catalyst which comprises at least one member selected from the group consisting of phosphoric acid, phosphates, chlorides and sulfates of the Ib elements, VIIa elements and VIII elements of the periodictable; and a second step in which the exhaust gas is contacted with a second catalyst which comprises silver aluminate.

The first catalyst used in the first step in this method is at least one member selected from the group consisting of phosphoric acid, phosphates, chlorides and sulfates of the Ib elements, VIIa elements and VIII elements of the periodic table.

The phosphate includes, for example, silver phosphate, copper phosphate, manganese phosphate, iron phosphate, cobalt phosphate and nickel phosphate. The chloride includes, for example, silver chloride, copper chloride, manganese chloride, iron chloride, cobalt chloride and nickel chloride. The sulfate includes, for example, silver sulfate, copper sulfate, iron sulfate, manganese sulfate, iron sulfate, cobalt sulfate and nickel sulfate.

The first catalyst may be prepared by supporting the member on a carrier material such as γ-alumina by, for example, a known impregnation method. By way of example, γ-alumina is impregnated with the member and is then calcined at 200–500° C. in air to provide a catalyst composed of the member supported on γ-alumina.

The supporting rate of the member, or the rate of the weight of the member to the total weight of the carrier material and the member, depends on the reaction conditions under which the catalyst is used, however, it is usually in the range of 0.05–5% by weight, preferably in the range of 0.1–3% by weight. When the supporting rate of the member is less than 0.05% by weight, the catalyst has no ability to convert the reducing agent or a hydrocarbon to oxygen-containing compounds or lower molecular weight hydrocarbons. Thus, the first step has little significance. When the supporting rate of the member is more than 0.5% by weight, the hydrocarbon is excessively oxidized and hence nitrogen oxides are not reduced efficiently in the second step.

In the first step, the exhaust gas is contacted with the first catalyst usually at a space velocity of 10000–1000000 hr$^{-1}$.

The reducing agent may be the same hydrocarbons as hereinbefore described in connection with CATALYSTS I and II. The amount of the reducing agent used is usually from about 0.1 to 5 mols, preferably from about 0.1 to 2 mols, per mol of nitrogen oxides. When the reducing agent is used in an amount of less than 0.1 mol per mol of nitrogen oxides, the second catalyst has no sufficient reducing activity. On the other hand, when the reducing agent is used in an amount of more than 5 mols per mol of nitrogen oxides, the amount of the reducing agent which is unreacted and discharged increases, and post treatment for recovery of the unreacted reducing agent is needed.

According to the method of the invention, the exhaust gas is contacted with the first catalyst in the presence of a hydrocarbon in an amount specified in relation to the amount of nitrogen oxides in the exhaust gas so that the hydrocarbon is converted to compounds which are highly reactive to nitrogen oxides, such as oxygen-containing compounds or lower molecular weight hydrocarbons. The thus formed compounds are then reacted as reducing agents with nitrogen oxides in the presence of the second catalyst in the second step.

The second catalyst used in the second step in this method is the CATALYST I or II described hereinbefore. It is preferred that the catalyst is composed of silver aluminate supported on alumina (CATALYST I).

In the second step, the exhaust gas is contacted with the second catalyst usually at a space velocity of 5000–100000 hr$^{-1}$.

The reaction temperature in the first and second step is usually in the range of 150–650° C., preferably in the range of 200–550° C. However, the reaction temperature may be different from each other in the first and second step, if necessary.

According to the method, as above described, the exhaust gas which contains nitrogen oxides is contacted with the first catalyst which is relatively high in partial oxidation activity, but is low in complete oxidation activity in the first step in the presence of a hydrocarbon so that the hydrocarbon is partially oxidized efficiently to oxygen-containing compounds or lower molecular weight hydrocarbons. These compounds act as a highly selective reducing agent for nitrogen oxides in the presence of the second catalyst in the second step. Accordingly, the method makes it possible to catalytically reduce nitrogen oxides in the exhaust gas in a stable and efficient manner even in the presence of oxygen, sulfur oxides or moisture, with the use of a reducing agent in a reduced molar ratio of the reducing agent to nitrogen oxides.

The invention is now illustrated in greater detail with reference to examples, however, it should be understood that the invention is not deemed to be limited thereto. All the parts, percents, and ratios are by weight unless otherwise indicated.

(1) Preparation of Catalyst I

EXAMPLE A-1

In 100 ml of ion-exchanged water was dissolved 4.75 g of silver nitrate (AgNO$_3$). Sixty grams of γ-alumina (KC-501 available from Sumitomo Kagaku Kogyo K.K.) was dried at 120° C. for 24 hours, and was added to the aqueous solution of silver nitrate to provide a slurry. One-tenth normal (0.1 N) ammonia water was added dropwise to the slurry with stirring while the slurry was maintained at a pH of about 8 with a pH controller. After the addition, the slurry was aged for one hour, thereby providing γ-alumina supporting silver ions thereon.

The γ-alumina supporting silver ions thereon thus obtained was collected by filtration and thoroughly washed with ion-exchanged water. The γ-alumina powder was then added to 100 ml of an aqueous hydrochloric acid solution to provide a slurry. After the slurry was stirred for ten minutes, the γ-alumina was separated from the slurry and thoroughly washed with ion-exchanged water, thereby providing a γ-alumina powder supporting silver chloride thereon in an amount of 5% by weight in terms of silver based on the powder.

The γ-alumina supporting silver chloride thereon thus obtained was heated and calcined at 800° C. for three hours in an air atmosphere containing 10% by weight of moisture, thereby providing a γ-alumina powder catalyst supporting silver aluminate thereon in an amount of 5% by weight in terms of silver based on the catalyst.

Figure 2:
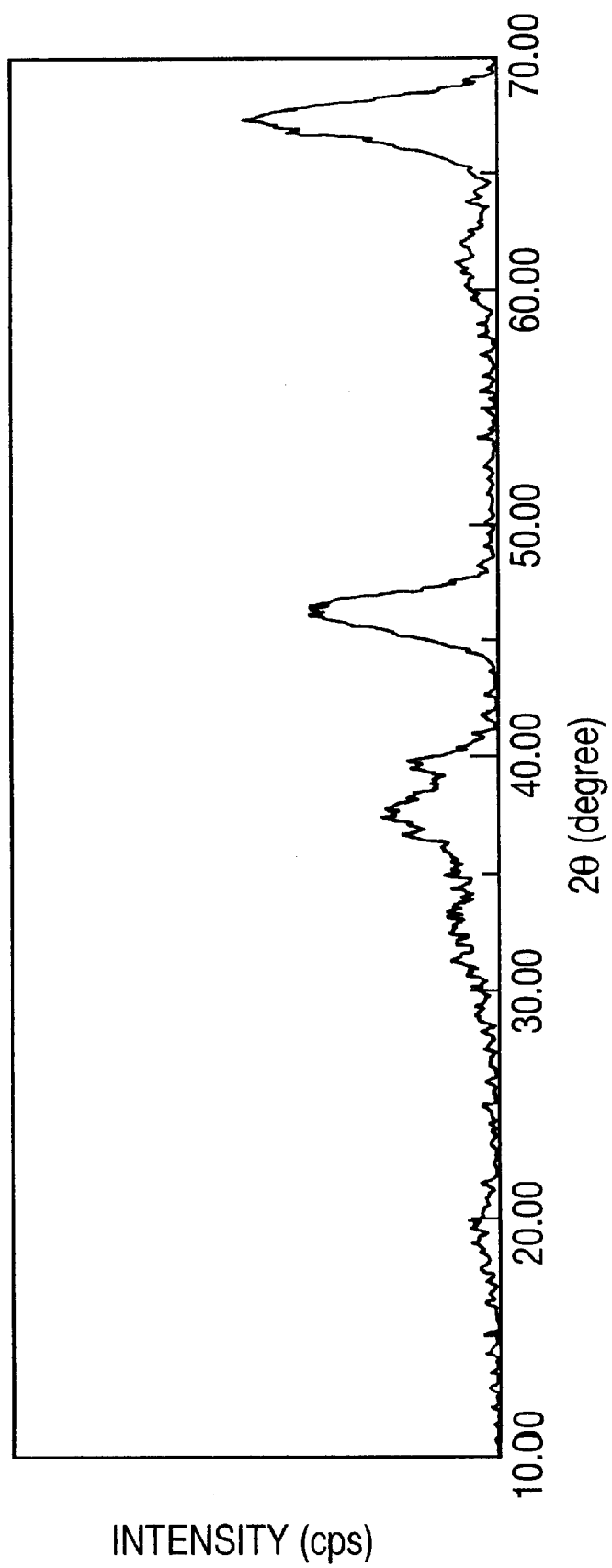
FIG. 2 shows an X-ray diffraction pattern of γ-alumina used in the preparation of the above mentioned catalyst.

FIG. 1 shows an X-ray diffraction pattern of the thus obtained γ-alumina supporting silver aluminate thereon in which circles indicate peaks due to silver aluminate; crosses indicate peaks due to alumina; and triangles indicate peaks due to silver. FIG. 2 shows an X-ray diffraction pattern of the γ-alumina used in the preparation of the catalyst shown in FIG. 1.

Sixty grams of the γ-alumina powder catalyst were mixed with 6 g of silica sol (Snowtex N available from Nissan Kagaku Kogyo K.K.) and an appropriate amount of water. The mixture was ground with a planetary mill for five minutes using 100 g of zirconia balls as grinding media to prepare a wash coat slurry. A honeycomb substrate of cordierite having a cell number of 200 per square inch was coated with the slurry to provide a honeycomb catalyst structure supporting the catalyst in an amount of about 150 g/l. The thickness of the catalyst layer was 78 μm. This catalyst is designated as Catalyst A-1.

EXAMPLE A-2

A γ-alumina powder catalyst supporting silver aluminate thereon in an amount of 3% by weight in terms of silver based on the catalyst was prepared in the same manner as in Example A-1, except for using 2.85 g of silver nitrate. The γ-alumina powder catalyst was supported on the same honeycomb substrate of cordierite as in Example A-1 to provide a honeycomb catalyst structure supporting the catalyst in an amount of about 150 g/l. The thickness of the catalyst layer was 85 μm. This catalyst is designated as Catalyst A-2.

EXAMPLE A-3

A γ-alumina powder catalyst supporting silver aluminate thereon in an amount of 1% by weight in terms of silver based on the catalyst was prepared in the same manner as in Example A-1, except for using 0.95 g of silver nitrate. The γ-alumina powder catalyst was supported on the same honeycomb substrate of cordierite as in Example A-1 to provide a honeycomb catalyst structure supporting the catalyst in an amount of about 150 g/l. The thickness of the catalyst layer was 88 μm. This catalyst is designated as Catalyst A-3.

EXAMPLE A-4

An amount of 8.69 g of aluminum nitrate (Al(NO$_3$)$_3$·9H$_2$O) was mixed with 3.94 g of silver nitrate, 100 g of hydrated alumina (available from Nizusawa Kagaku Kogyo K.K.) and an appropriate amount of water to prepare a paste. The paste was kneaded and dried by use of a heating kneader, and then heated and calcined at 800° C. for three hours in an air atmosphere containing 10% by weight of moisture, thereby providing a γ-alumina powder catalyst supporting silver aluminate thereon in an amount of 2.5% by weight in terms of silver based on the catalyst.

The γ-alumina powder catalyst was supported on the same honeycomb substrate of cordierite as in Example A-1 to provide a honeycomb catalyst structure supporting the catalyst in an amount of about 150 g/l. The thickness of the catalyst layer was 83 μm. This catalyst is designated as Catalyst A-4.

EXAMPLE A-5

One kilogram of the same γ-alumina as in Example A-1 was kneaded with 79.2 g of silver nitrate, 1 kg of polyethylene oxide (PEO-10 available from Sumitomo Seika K.K.) and an appropriate amount of water. The mixture was extruded into a honeycomb structure having a cell number of 200 per square inch by use of an auger screw extruder. The honeycomb structure was air-dried at normal temperatures, dried overnight at 100° C., and then calcined at 500° C. for three hours to prepare a honeycomb structure having a wall thickness of 205 μm and supporting silver (and/or silver oxide) thereon.

The honeycomb structure supporting silver (and/or silver oxide) was added to an aqueous hydrochloric solution to chlorinate the silver (and/or silver oxide), thereby providing a honeycomb structure supporting silver chloride in an amount of 5% by weight in terms of silver.

The honeycomb structure was then heated and calcined at 800° C. for three hours in an air atmosphere containing 10% by weight of moisture, thereby providing a γ-alumina honeycomb catalyst structure supporting silver aluminate thereon in an amount of 5% by weight in terms of silver based on the catalyst. The honeycomb catalyst structure had a catalyst layer of 102 μm in thickness. This catalyst is designated as Catalyst A-5.

EXAMPLE A-6

An amount of 8.69 g of aluminum nitrate ($Al(NO_3)_3 \cdot 9H_2O$) was mixed with 3.94 g of silver nitrate, 100 g of hydrated alumina (available from Mizusawa Kagaku Kogyo K.K.) and an appropriate amount of water to prepare a paste. The paste was kneaded and dried by use of a heating kneader, and then heated and calcined at 600° C. for 18 hours in an air atmosphere containing 10% by weight of moisture, thereby providing a γ-alumina powder catalyst supporting silver aluminate thereon in an amount of 2.5% by weight in terms of silver based on the catalyst.

The γ-alumina powder catalyst was supported on the same honeycomb substrate of cordierite as in Example A-1 to provide a honeycomb catalyst structure supporting the catalyst in an amount of about 150 g/l. The thickness of the catalyst layer was 71 μm. This catalyst is designated as Catalyst A-6.

Figure 3:
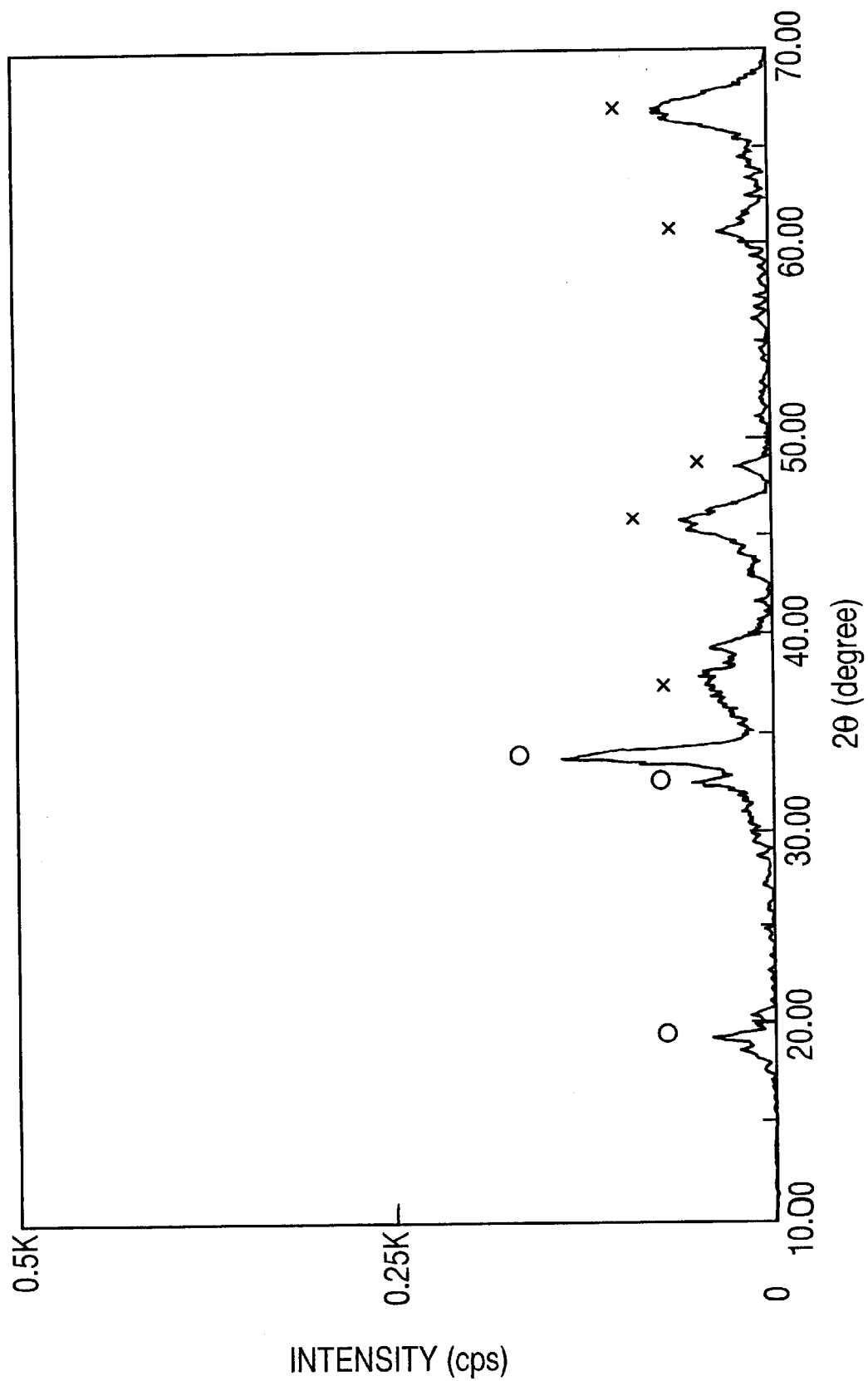
FIG. 3 shows an X-ray diffraction pattern of a γ-alumina/cordierite catalyst structure which supports silver aluminate thereon.

FIG. 3 shows an X-ray diffraction pattern of the thus obtained γ-alumina/cordierite catalyst structure supporting silver aluminate thereon, in which circles indicate peaks due to silver aluminate and crosses indicate peaks due to alumina.

EXAMPLE A-7

One kilogram of the same γ-alumina as in Example A-1 was kneaded with 79.2 g of silver nitrate, 1 kg of polyethylene oxide (PEO-10 available from Sumitomo Seika K.K.) and an appropriate amount of water. The mixture was extruded into a honeycomb structure having a cell number of 200 per square inch by use of an auger screw extruder. The honeycomb structure was air-dried at normal temperatures, dried overnight at 100° C., and then calcined at 500° C. for three hours to prepare an alumina honeycomb structure having a wall thickness of 200 μm and supporting silver (and/or silver oxide) thereon.

The honeycomb structure was then heated and calcined at 600° C. for 18 hours in an air atmosphere containing 10% by weight of moisture, thereby providing a γ-alumina honeycomb catalyst structure supporting silver aluminate thereon in an amount of 5% by weight in terms of silver based on the honeycomb catalyst structure. The honeycomb catalyst structure had a catalyst layer of 100 μm in thickness. This catalyst is designated as Catalyst A-7.

EXAMPLE A-8

The γ-alumina powder catalyst supporting silver aluminate thereon in an amount of 5% by weight in terms of silver based on the catalyst as prepared in Example A-1 was wash-coated on a honeycomb substrate of cordierite to provide a honeycomb catalyst structure supporting the catalyst in an amount of about 100 g/l. The thickness of the catalyst layer was 52 μm. This catalyst is designated as Catalyst A-8.

EXAMPLE A-9

The γ-alumina powder catalyst supporting silver aluminate thereon in an amount of 5% by weight in terms of silver based on the catalyst as prepared in Example A-1 was wash-coated on a honeycomb substrate of cordierite to provide a honeycomb catalyst structure supporting the catalyst in an amount of about 70 g/l. The thickness of the catalyst layer was 36 μm. This catalyst is designated as Catalyst A-9.

EXAMPLE A-10 (Comparative)

A γ-alumina powder catalyst supporting silver ions thereon in an amount of 5% by weight based on the catalyst was prepared in the same manner as in Example A-1. The γ-alumina powder catalyst was coated on a honeycomb substrate of cordierite to provide a honeycomb catalyst structure supporting the powder catalyst in an amount of about 150 g/l. The thickness of the catalyst layer was 78 μm. This catalyst is designated as Catalyst A-10.

EXAMPLE A-11 (Comparative)

The γ-alumina honeycomb catalyst structure supporting silver (and/or silver oxide) in an amount of 5% by weight in terms of silver and having a wall thickness of 205 μm (i.e., having a catalyst layer of 102 μm in thickness) was used as it was as a catalyst A-11.

EXAMPLE A-12 (Comparative)

The γ-alumina powder catalyst supporting silver aluminate thereon in an amount of 5% by weight in terms of silver based on the catalyst as prepared in Example A-1 was wash-coated on a honeycomb substrate of cordierite to provide a honeycomb catalyst structure supporting the catalyst in an amount of about 50 g/l. The thickness of the catalyst layer was 26 μm. This catalyst is designated as Catalyst A-12.

EXAMPLE A-13 (Comparative)

An amount of 8.69 g of aluminum nitrate ($Al(NO_3)_3 \cdot 9H_2O$), 3.94 g of silver nitrate and 100 g of hydrated alumina (available from Mizusawa Kagaku Kogyo K.K.) were mixed with an appropriate amount of water to prepare a paste. The paste was kneaded and dried by use of a heating kneader, and then heated and calcined at 300° C. for 18 hours in an air atmosphere containing 10% by weight of moisture, thereby providing a γ-alumina powder catalyst.

In the same manner as in Example A-1, a honeycomb substrate of cordierite was coated with the γ-alumina powder catalyst to provide a honeycomb catalyst structure supporting the catalyst in an amount of about 150 g/l. The thickness of the catalyst layer was 71 μm. This catalyst is designated as Catalyst A-13.

Figure 4:
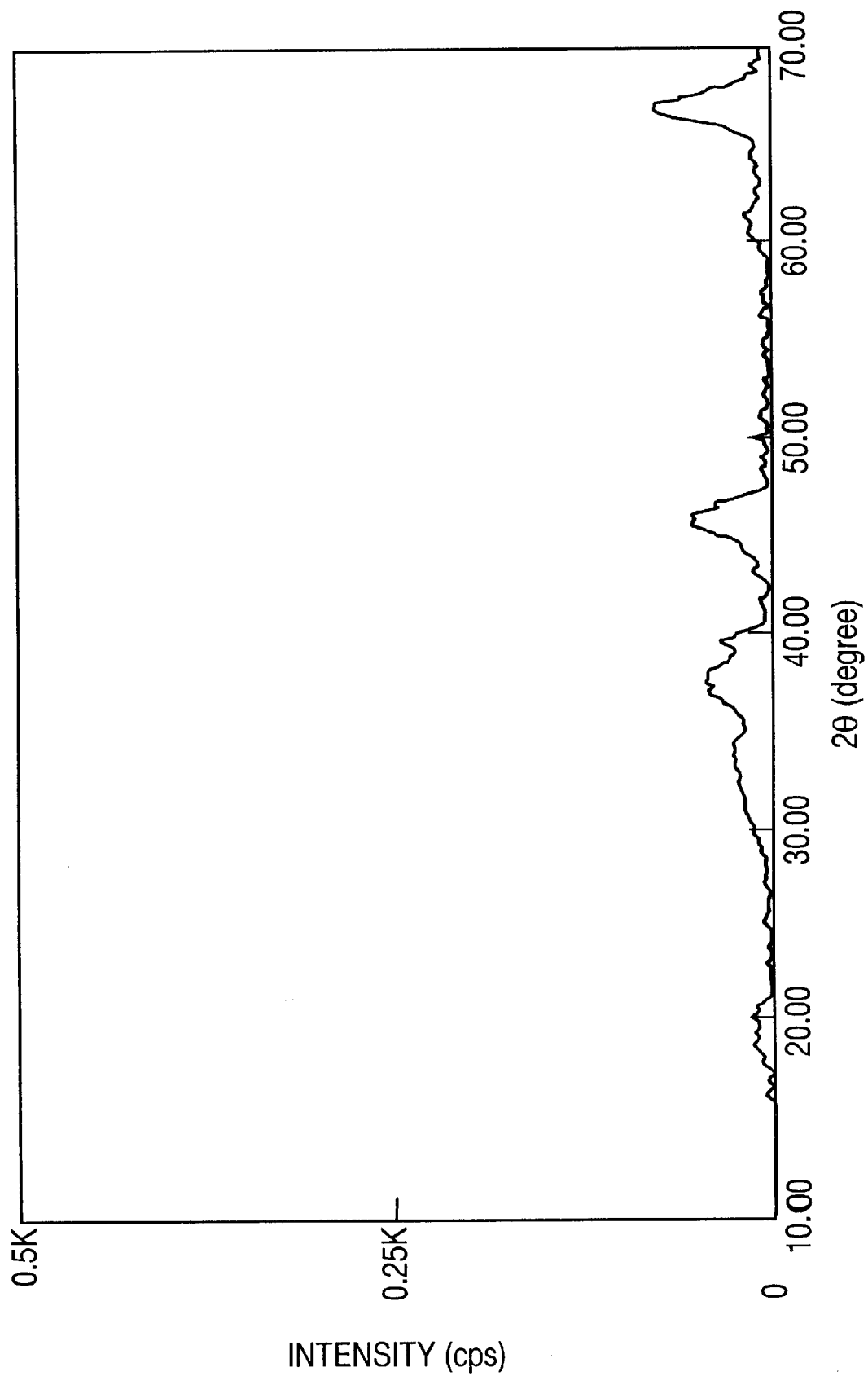
FIG. 4 shows an X-ray diffraction pattern of a γ-alumina catalyst prepared by impregnating hydrated alumina with aluminum nitrate and silver nitrate and then by calcining the product at a temperature of 300° C. in the presence of water vapor.

FIG. 4 shows an X-ray diffraction pattern of the thus obtained γ-alumina/cordierite catalyst.

EXAMPLE A-14 (Comparative)

A γ-alumina powder catalyst was prepared in the same manner as in Example A-13 except that the calcining temperature was 400° C.

In the same manner as in Example A-1, a honeycomb substrate of cordierite was coated with the γ-alumina powder catalyst to provide a honeycomb catalyst structure supporting the catalyst in an amount of about 150 g/l. The thickness of the catalyst layer was found to be 71 μm. This catalyst is designated as Catalyst A-14.

The X-ray diffraction pattern of the thus obtained γ-alumina/cordierite catalyst was found substantially the same as that obtained in Example A-13.

EXAMPLE A-15 (Comparative)

A γ-alumina powder catalyst was prepared in the same manner as in Example A-13 except that the calcining temperature was 500° C.

In the same manner as in Example A-1, a honeycomb substrate of cordierite was coated with the γ-alumina powder catalyst to provide a honeycomb catalyst structure supporting the catalyst in an amount of about 150 g/l. The thickness of the catalyst layer was 71 μm. This catalyst is designated as Catalyst A-15.

Figure 5:
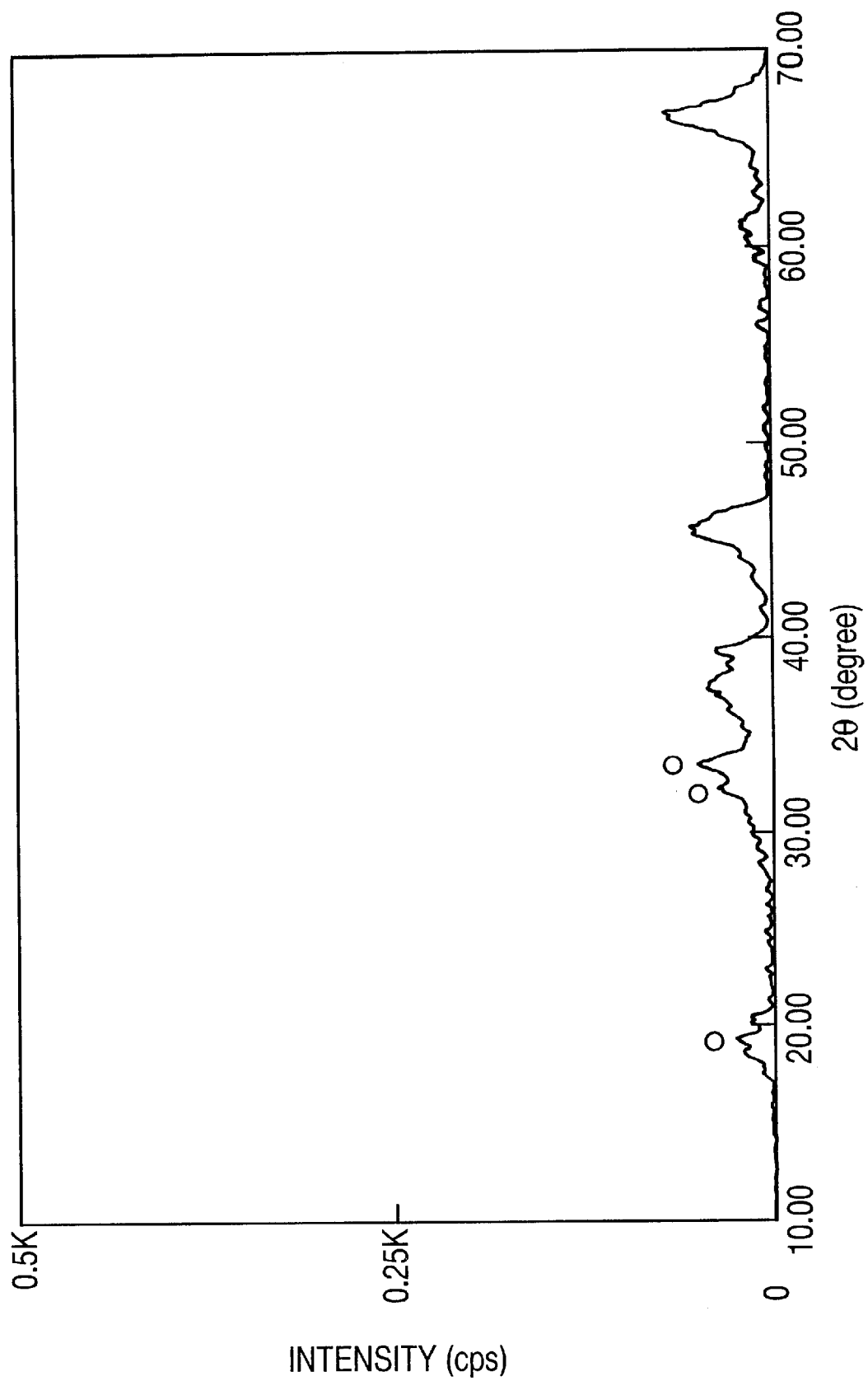
FIG. 5 shows an X-ray diffraction pattern of a γ-alumina catalyst prepared in the same manner as above except that the calcining temperature was 500° C.

FIG. 5 shows an X-ray diffraction pattern of the thus obtained γ-alumina/cordierite catalyst.

EXAMPLE A-16

A γ-alumina powder catalyst was prepared in the same manner as in Example A-13 except that the calcining temperature was 700° C.

In the same manner as in Example A-1, a honeycomb substrate of cordierite was coated with the γ-alumina powder catalyst to provide a honeycomb catalyst structure supporting the catalyst in an amount of about 150 g/l. The thickness of the catalyst layer was 71 μm. This catalyst is designated as Catalyst A-16.

Figure 6:
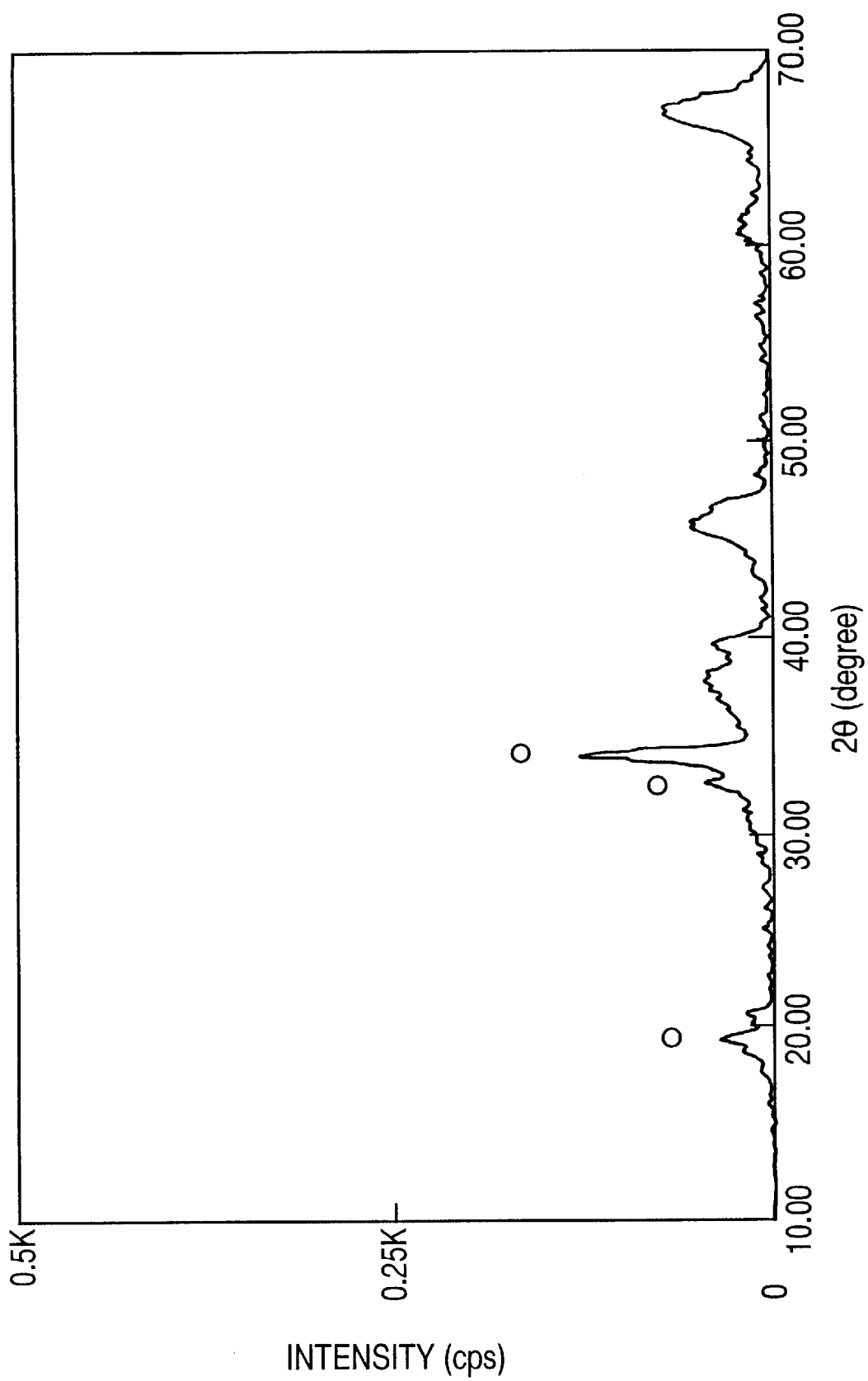
FIG. 6 shows an X-ray diffraction pattern of a γ-alumina catalyst prepared in the same manner as above except that the calcining temperature was 700° C.

FIG. 6 shows an X-ray diffraction pattern of the thus obtained γ-alumina/cordierite catalyst.

EXAMPLE A-17

A γ-alumina powder catalyst was prepared in the same manner as in Example A-13 except that the calcining temperature was 900° C.

In the same manner as in Example A-1 a honeycomb substrate of cordierite was coated with the γ-alumina powder catalyst to provide a honeycomb catalyst structure supporting the catalyst in an amount of about 150 g/l. The thickness of the catalyst layer was found to be 71 μm. This catalyst is designated as Catalyst A-17.

The X-ray diffraction pattern of the thus obtained γ-alumina/cordierite catalyst was found substantially the same as that obtained in Example A-1.

EXAMPLE A-18 (Comparative)

A γ-alumina powder catalyst was prepared in the same manner as in Example A-13 except that the calcining temperature was 1000° C.

In the same manner as in Example A-1, a honeycomb substrate of cordierite was coated with the γ-alumina powder catalyst to provide a honeycomb catalyst structure supporting the catalyst in an amount of about 150 g/l. The thickness of the catalyst layer was 71 μm. This catalyst is designated as Catalyst A-18.

Figure 7:
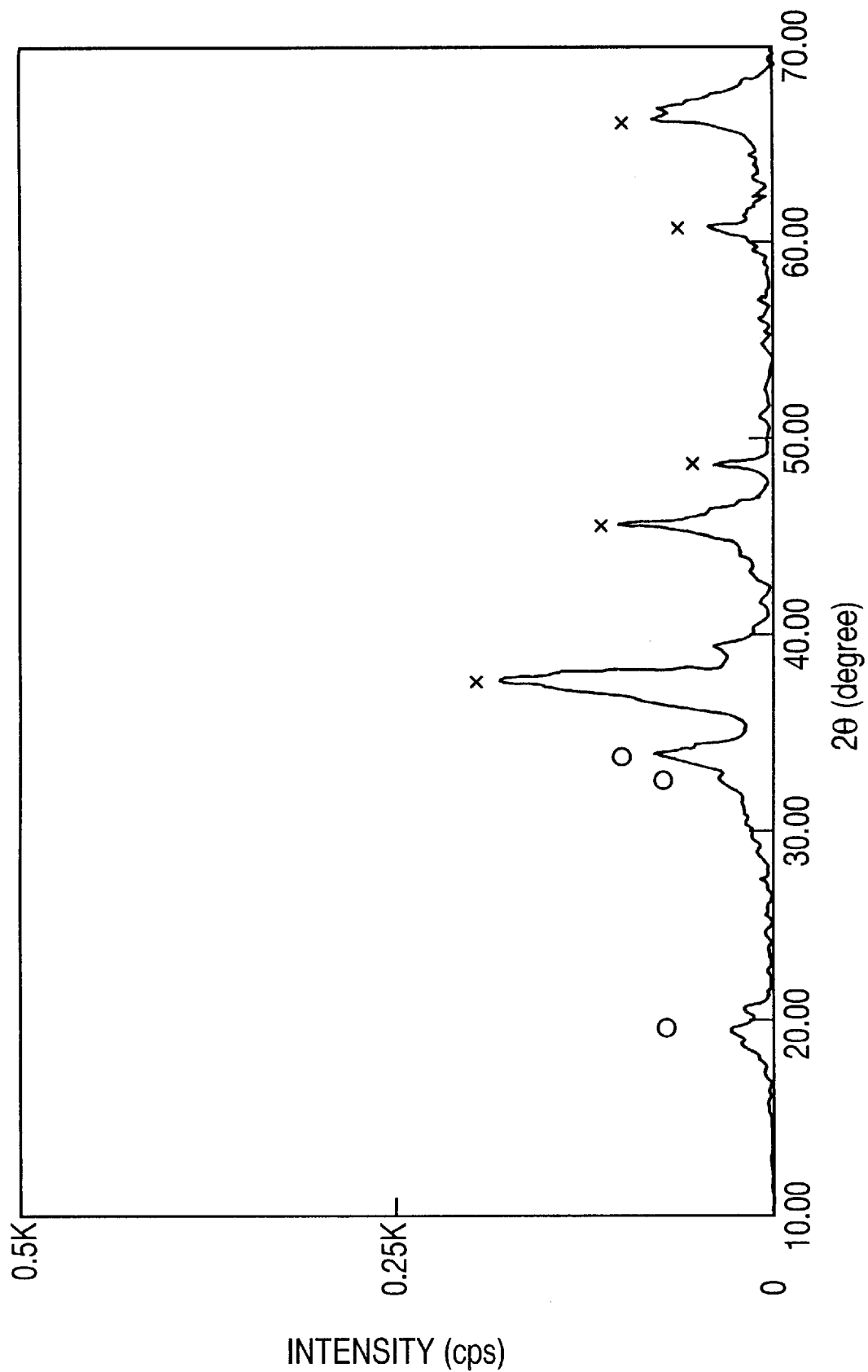
FIG. 7 shows an X-ray diffraction pattern of a γ-alumina catalyst prepared in the same manner as above except that the calcining temperature was 1000° C.

FIG. 7 shows an X-ray diffraction pattern of the thus obtained γ-alumina/cordierite catalyst.

(2) Performance Tests

Using the catalysts (A-1 to A-9, A-16 and A-17) and the comparative catalysts (A-10 to A-15 and A-18), a nitrogen oxide containing gas was reduced under the conditions below. The conversion of nitrogen oxides to nitrogen was determined by a chemical luminescence method.

Test Conditions (i) Gas Composition

NO: 500 ppm $O_2$: 10% by volume

Reducing agent: 500 ppm

Water: 6% by volume

Nitrogen: balance (In the case gas oil was used as a reducing agent, it was deemed as a hydrocarbon of 12 carbons.)

(ii) Space Velocity: 25000 $hr^{-1}$ (iii) Reaction Temperature

250° C., 300° C., 350° C., 400° C., 450° C. or 500° C.

The results are shown in Table 1.

TABLE 1

| Catalyst | Reducing Agent | Nitrogen Oxide Conversion (%) | | | | | |
|---|---|---|---|---|---|---|---|
| | | 250° C. | 300° C. | 350° C. | 400° C. | 450° C. | 500° C. |
| A-1 | light oil | 26.6 | 41.3 | 66.0 | 58.3 | 54.8 | 37.0 |
| | propylene | 35.6 | 60.0 | 72.7 | 67.5 | 59.5 | 43.6 |
| | propane | 30.2 | 55.8 | 69.0 | 71.9 | 67.8 | 47.1 |
| | ethanol | 47.4 | 73.9 | 87.2 | 78.9 | 44.4 | 18.9 |
| | methyl ethyl ether | 55.7 | 64.8 | 46.0 | 23.0 | 0.0 | 0.0 |
| | acetone | 36.3 | 50.3 | 62.6 | 41.0 | 25.1 | 7.5 |
| | ethyl acetate | 27.1 | 42.8 | 50.1 | 40.3 | 19.4 | 3.3 |
| A-2 | light oil | 17.8 | 31.5 | 55.5 | 46.1 | 43.4 | 26.2 |
| A-3 | light oil | 12.3 | 23.0 | 45.8 | 40.3 | 34.6 | 24.4 |
| A-4 | light oil | 13.5 | 26.4 | 49.6 | 42.4 | 38.8 | 21.5 |
| A-5 | light oil | 33.0 | 68.5 | 75.9 | 67.6 | 61.9 | 46.6 |
| A-6 | light oil | 18.4 | 38.4 | 59.9 | 57.8 | 42.5 | 26.7 |
| A-7 | light oil | 46.4 | 75.1 | 81.1 | 74.2 | 68.8 | 55.5 |
| A-8 | light oil | 28.6 | 42.4 | 64.8 | 55.3 | 55.0 | 34.9 |
| A-9 (Comparative) | light oil | 24.9 | 38.3 | 62.0 | 55.9 | 50.5 | 31.5 |
| A-10 | light oil | 14.9 | 15.8 | 12.7 | 5.3 | 0.0 | 0.0 |
| A-11 | light oil | 15.2 | 16.7 | 10.4 | 3.1 | 0.0 | 0.0 |
| A-12 (Comparative) | light oil | 16.8 | 27.5 | 32.9 | 38.6 | 40.7 | 28.3 |
| A-13 | light oil | 18.2 | 28.8 | 29.1 | 19.7 | 9.7 | 5.0 |
| A-14 | light oil | 17.7 | 27.3 | 31.0 | 20.4 | 11.2 | 6.2 |
| A-15 | light oil | 15.0 | 20.6 | 39.5 | 28.6 | 21.3 | 9.6 |
| A-16 | light oil | 12.9 | 26.1 | 48.4 | 41.6 | 38.4 | 20.6 |

TABLE 1-continued

| Catalyst | Reducing Agent | Nitrogen Oxide Conversion (%) | | | | | |
|---|---|---|---|---|---|---|---|
| | | 250° C. | 300° C. | 350° C. | 400° C. | 450° C. | 500° C. |
| A-17 (Comparative) | light oil | 16.7 | 29.0 | 51.8 | 45.2 | 39.9 | 22.3 |
| A-18 | light oil | 9.1 | 11.3 | 26.3 | 34.3 | 21.6 | 17.5 |

Using the catalyst A-5 and the comparative catalyst A-11, a nitrogen oxide containing gas of which composition is shown below was first reduced at a temperature of 700° C. and at a space velocity of 25000 hr$^{-1}$ for a period of 500 hours, and then the nitrogen oxide containing gas was reduced under the conditions (ii) and (iii) above specified. The resistance to heat and sulfur oxides of the catalysts were evaluated. The results are shown in Table 2.

Gas Composition

NO: 500 ppm $O_2$: 10% by volume

Propylene: 500 ppm $SO_2$: 200 ppm

Water: 6% by volume

Nitrogen: balance

TABLE 2

| Catalyst | Reducing Agent | Nitrogen Oxide Conversion (%) | | | | | |
|---|---|---|---|---|---|---|---|
| | | 250° C. | 300° C. | 350° C. | 400° C. | 450° C. | 500° C. |
| A-5 | light oil | 27.6 | 56.3 | 68.5 | 77.8 | 72.2 | 58.8 |
| (Comparative) A-11 | light oil | 3.6 | 8.4 | 14.2 | 15.9 | 15.0 | 9.8 |

As is apparent from Tables 1 and 2, the catalysts of the invention achieves high conversion of nitrogen oxides, whereas the comparative catalysts have on the whole a low conversion rate of nitrogen oxides. In addition, the catalysts of the invention are durable even when they are used at high temperatures and excellent in resistance to sulfur oxides.

Preparation of Catalyst II

EXAMPLE B-1

In the same manner as in Example A-1, a γ-alumina powder catalyst supporting silver aluminate thereon in an amount of 2.5% by weight in terms of silver based on the catalyst was prepared.

Sixty grams of the γ-alumina powder catalyst were mixed with 6 g of silica sol (Snowtex N available from Nissan Kagaku Kogyo K.K.) and an appropriate amount of water. The mixture was ground with a planetary mill for five minutes using 100 g of zirconia balls as grinding media to prepare a wash coat slurry. A honeycomb substrate of cordierite having a cell number of 200 per square inch was coated with the slurry to provide a honeycomb catalyst structure supporting the catalyst in an amount of about 150 g/l. The thickness of the catalyst layer was 78 μm.

The honeycomb catalyst structure was then immersed in an aqueous solution of 0.088 g of ammonium molybdate $((NH_4)_6Mo_7O_{24}\cdot 4H_2O)$ in 300 ml of ion-exchanged water for one hour. The honeycomb catalyst structure was taken out of the solution and excess solution adhering to the honeycomb catalyst structure was removed. The honeycomb catalyst structure was then air-dried at normal temperatures and dried at 180° C. for 12 hours, followed by calcining at 500° C. for three hours, thereby providing a honeycomb catalyst structure supporting thereon a γ-alumina catalyst composed of γ-alumina which supported silver aluminate in an amount of 2.5% by weight in terms of silver and molybdenum trioxide ($MoO_3$) in an amount of 0.01% by weight in terms of molybdenum based on the γ-alumina catalyst. This catalyst is designated as Catalyst B-1.

EXAMPLE B-2

A honeycomb catalyst structure supporting thereon a γ-alumina catalyst composed of γ-alumina which supported silver aluminate in an amount of 1.25% by weight in terms of silver and molybdenum trioxide ($NoO_3$) in an amount of 0.01% by weight in terms of molybdenum based on the γ-alumina was prepared in the same manner as in Example B-1, except for using 1.19 g of silver nitrate. The γ-alumina catalyst was supported on the honeycomb catalyst structure in an amount of about 150 g/l in a catalyst layer of 85 μm in thickness. This catalyst is designated as Catalyst B-2.

EXAMPLE B-3

A honeycomb catalyst structure supporting thereon a γ-alumina catalyst composed of γ-alumina which supported silver aluminate in an amount of 0.63% by weight in terms of silver and molybdenum trioxide ($MoO_3$) in an amount of 0.01% by weight in terms of molybdenum based on the γ-alumina was prepared in the same manner as in Example B-1, except for using 0.60 g of silver nitrate. The γ-alumina catalyst was supported on the honeycomb catalyst structure in an amount of about 150 g/l in a catalyst layer of 88 μm in thickness. This catalyst is designated as Catalyst B-3.

EXAMPLE B-4

An amount of 8.69 g of aluminum nitrate ($Al(NO_3)_3 \cdot 9H_2O$) was mixed with 3.94 g of silver nitrate, 0.050 g of ammonium molybdate $((NH_4)_6Mo_7O_{24}\cdot 4H_2O)$, 100 g of hydrated alumina (available from Mizusawa Kagaku Kogyo K.K.) and an appropriate amount of water to prepare a paste. The paste was kneaded and dried by use of a heating kneader, and then heated and calcined at 800° C. for three hours in an air atmosphere containing 10% by weight of moisture, thereby providing a γ-alumina catalyst supporting molybdenum trioxide ($MoO_3$) in an amount of 0.01% in terms of molybdenum and silver aluminate in an amount of 2.5% by weight in terms of silver based on the γ-alumina catalyst.

The γ-alumina powder catalyst was supported on the same honeycomb substrate of cordierite as in Example B-1 to provide a honeycomb catalyst structure supporting the catalyst in an amount of about 150 g/l. The thickness of the catalyst layer was 83 μm. This catalyst is designated as Catalyst B-4.

EXAMPLE B-5

One kilogram of aluminum hydroxide in terms of γ-alumina was kneaded with 39.6 g of silver nitrate, 1.55 g of an ammonium metatungstate solution (50% by weight concentration as $WO_3$, available from Shin-Nippon Kinzoku K.K.), 1 kg of polyethylene oxide (PEO-10 available from Sumitomo Seika K.K.) and an appropriate amount of water. The mixture was extruded into a honeycomb structure having a cell number of 200 per square inch by use of an auger screw extruder. The honeycomb structure was air-dried at normal temperatures, dried at 100° C. overnight, and then calcined at 500° C. for three hours to prepare a γ-alumina honeycomb structure having a wall thickness of 205 μm and supporting thereon tungsten trioxide ($WO_3$) and silver (and/or silver oxide).

The honeycomb structure supporting tungsten trioxide and silver (and/or silver oxide) was heated and calcined at 800° C. for three hours in an air atmosphere containing 10% by weight of moisture, thereby providing a γ-alumina honeycomb catalyst structure having a catalyst layer of 102 μm in thickness and supporting tungsten trioxide ($WO_3$) in an amount of 0.05% by weight in terms of tungsten and silver aluminate in an amount of 2.5% by weight in terms of silver based on the honeycomb catalyst structure. This catalyst is designated as Catalyst B-5.

EXAMPLE B-6

An amount of 8.69 g of aluminum nitrate ($Al(NO_3)_3 \cdot 9H_2O$), 3.94 g of silver nitrate, 0.050 g of ammonium molybdate (($NH_4)_6Mo_7O_{24} \cdot 4H_2O$) and 100 g of hydrated alumina (available from Mizusawa Kagaku Kogyo K.K.) in terms of γ-alumina were mixed with an appropriate amount of water to prepare a paste. The paste was kneaded and dried by use of a heating kneader, and then heated and calcined at 600° C. for 18 hours in an air atmosphere containing 10% by weight of moisture, thereby providing a γ-alumina powder catalyst supporting molybdenum trioxide ($MoO_3$) in an amount of 0.01% by weight in terms of molybdenum and silver aluminate in an amount of 2.5% by weight in terms of silver based on the catalyst.

The γ-alumina powder catalyst was supported on the same honeycomb substrate of cordierite as in Example B-1 to provide a honeycomb catalyst structure supporting the catalyst in an amount of about 150 g/l. The honeycomb catalyst structure had a catalyst layer of 71 μm in thickness. This catalyst is designated as Catalyst B-6.

EXAMPLE B-7

One kilogram (in terms of γ-alumina) of the same hydrated alumina as in Example B-4, 31.7 g of silver nitrate, 1.24 g of an ammonium metatungstate solution (50% by weight concentration as $WO_3$, available from Shin-Nippon Kinzoku K.K.), 1 kg of polyethylene oxide (PEO-10 available from Sumitomo Seika K.K.) were mixed and kneaded with an appropriate amount of water. The mixture was extruded into a honeycomb structure having a cell number of 200 per square inch by use of an auger screw extruder. The honeycomb structure was air-dried at normal temperatures, dried at 100° C. overnight, and then calcined at 500° C. for three hours to prepare an γ-alumina honeycomb structure having a wall thickness of 200 μm and supporting tungsten trioxide ($WO_3$) and silver (and/or silver oxide) thereon.

The honeycomb structure was then heated and calcined at 600° C. for 18 hours in an air atmosphere containing 10% by weight of moisture, thereby providing a γ-alumina honeycomb catalyst structure having a catalyst layer of 100 μm in thickness and supporting tungsten trioxide in an amount of 0.01% by weight in terms of tungsten and silver aluminate in an amount of 2% by weight in terms of silver based on the honeycomb catalyst structure. This catalyst is designated as Catalyst B-7.

EXAMPLE B-8

The γ-alumina powder catalyst supporting molybdenum trioxide ($MoO_3$) in an amount of 0.01% by weight in terms of molybdenum and silver aluminate in an amount of 2.5% by weight in terms of silver based on the catalyst as prepared in Example B-4 was wash-coated on a honeycomb substrate of cordierite to provide a honeycomb catalyst structure supporting the catalyst in an amount of about 100 g/l. The honeycomb catalyst structure had a catalyst layer of 52 μm in thickness. This catalyst is designated as Catalyst B-8.

EXAMPLE B-9

The γ-alumina powder catalyst supporting molybdenum trioxide ($MoO_3$) in an amount of 0.01% by weight in terms of molybdenum and silver aluminate in an amount of 2.5% by weight in terms of silver based on the catalyst as prepared in Example B-4 was wash-coated on a honeycomb substrate of cordierite to provide a honeycomb catalyst structure supporting the catalyst in an amount of about 70 g/l. The honeycomb catalyst structure had a catalyst layer of 36 μm in thickness. This catalyst is designated as Catalyst B-9.

EXAMPLE B-10

An amount of 8.69 g of aluminum nitrate ($Al(NO_3)_3 \cdot 9H_2O$), 3.94 g of silver nitrate, 0.050 g of ammonium molybdate (($NH_4)_6Mo_7O_{24} \cdot 4H_2O$) and 100 g of hydrated alumina (available from Mizusawa Kagaku Kogyo K.K.) in terms of γ-alumina were mixed with an appropriate amount of water to prepare a paste. The paste was kneaded and dried by use of a heating kneader, and then heated and calcined at 800° C. for three hours in an air atmosphere containing 10% by weight of moisture, thereby providing a γ-alumina powder catalyst supporting molybdenum trioxide ($MoO_3$) in an amount of 0.0001% by weight in terms of molybdenum and silver aluminate in an amount of 2.5% by weight in terms of silver based on the catalyst.

The γ-alumina powder catalyst was supported on the same honeycomb substrate of cordierite as in Example B-1 to provide a honeycomb catalyst structure supporting the catalyst in an amount of about 145 g/l. The honeycomb catalyst structure had a catalyst layer of 80 μm in thickness. This catalyst is designated as Catalyst B-10.

EXAMPLE B-11

An amount of 8.69 g of aluminum nitrate ($Al(NO_3)_3 \cdot 9H_2O$), 3.94 g of silver nitrate, 0.25 g of ammonium molybdate (($NH_4)_6Mo_7O_{24} \cdot 4H_2O$) and 100 g of hydrated alumina (available from Mizusawa Kagaku Kogyo K.K.) in terms of γ-alumina were mixed with an appropriate amount of water to prepare a paste. The paste was kneaded and dried by use of a heating kneader, and then heated and calcined at 800° C. for three hours in an air atmosphere containing 10% by weight of moisture, thereby providing a γ-alumina powder catalyst supporting molybdenum trioxide ($MoO_3$) in an amount of 0.05% by weight in terms of molybdenum and silver aluminate in an amount of 2.5% by weight in terms of silver based on the catalyst.

The γ-alumina powder catalyst was supported on the same honeycomb substrate of cordierite as in Example B-1 to provide a honeycomb catalyst structure supporting the catalyst in an amount of about 140 g/l. The honeycomb catalyst structure had a catalyst layer of 77 μm in thickness. This catalyst is designated as Catalyst B-11.

EXAMPLE B-12

A γ-alumina honeycomb catalyst structure having a catalyst layer of 200 μm in thickness and supporting tungsten trioxide ($WO_3$) in an amount of 0.05% by weight in terms of tungsten and silver aluminate in an amount of 2% by weight in terms of silver based on the catalyst structure was prepared in the same manner as in Example B-7, except for using 6.20 g of the ammonium metatungstate solution. This catalyst is designated as Catalyst B-12.

EXAMPLE B-13

An amount of 8.69 g of aluminum nitrate ($Al(NO_3)_3 \cdot 9H_2O$), 3.94 g of silver nitrate, 1.0 ml of a vanadyl oxalate solution (1 g/l concentration as $V_2O_5$) and 100 g of hydrated alumina (available from Mizusawa Kagaku Kogyo K.K.) in terms of γ-alumina were mixed with an appropriate amount of water to prepare a paste. The paste was kneaded and dried by use of a heating kneader, and then heated and calcined at 800° C. for three hours in an air atmosphere containing 10% by weight of moisture, thereby providing a γ-alumina powder catalyst supporting vanadium oxide ($V_2O_5$) in an amount of 0.001% by weight in terms of vanadium and silver aluminate in an amount of 2.5% by weight of silver based on the catalyst.

The γ-alumina powder catalyst was supported on the same honeycomb substrate of cordierite as in Example B-1 to provide a honeycomb catalyst structure supporting the catalyst in an amount of about 150 g/l. The honeycomb catalyst structure had a catalyst layer of 85 μm in thickness. This catalyst is designated as Catalyst B-13.

EXAMPLE B-14

One kilogram (in terms of γ-alumina) of the same aluminum hydroxide as used in Example B-5, 31.7 g of silver nitrate, 24.8 g of an ammonium metatungstate solution (50% by weight concentration as $WO_3$, available from Shin-Nippon Kinzoku K.K.) and 1 kg of polyethylene oxide (PEO-10 available from Sumitomo Seika K.K.) were mixed with an appropriate amount of water. The mixture was thoroughly kneaded together and was extruded into a honeycomb structure having a cell number of 200 per square inch by use of an auger screw extruder. The honeycomb structure was air-dried at normal temperatures, dried at 100° C. overnight, and then calcined at 500° C. for three hours to prepare a γ-alumina honeycomb structure having a wall thickness of 200 μm and supporting tungsten trioxide ($WO_3$) and silver (and/or silver oxide) thereon.

The honeycomb structure supporting tungsten trioxide and silver (and/or silver oxide) was heated and calcined at 600° C. for 18 hours in an air atmosphere containing 10% by weight of moisture, thereby providing a γ-alumina honeycomb catalyst structure having a catalyst layer of 200 μm in thickness and supporting tungsten trioxide ($WO_3$) in an amount of 0.2% by weight in terms of tungsten and silver aluminate in an amount of 2.0% by weight in terms of silver based on the γ-alumina honeycomb catalyst structure. This catalyst is designated as Catalyst B-14.

EXAMPLE B-15 (Comparative)

A γ-alumina powder catalyst supporting silver ions thereon in an amount of 2.5% by weight based on the catalyst was prepared in the same manner as in Example B-1. The γ-alumina powder catalyst was coated on a honeycomb substrate of cordierite to provide a honeycomb catalyst structure having a catalyst layer of 78 μm in thickness and supporting the catalyst in an amount of about 140 g/l. This catalyst is designated as Catalyst B-15.

EXAMPLE B-16 (Comparative)

A γ-alumina honeycomb catalyst structure having a wall thickness of 205 μm, a catalyst layer of 102 μm in thickness and supporting silver (and/or silver oxide) in an amount of 5% by weight in terms of silver based on the catalyst was prepared in the same manner as in Example B-5 except that the ammonium metatungstate solution was not used. This catalyst is designated as Catalyst B-16.

EXAMPLE B-17 (Comparative)

The γ-alumina powder catalyst supporting silver aluminate thereon in an amount of 2.5% by weight in terms of silver based on the catalyst as prepared in Example B-1 was wash-coated on a honeycomb substrate of cordierite to provide a honeycomb catalyst structure supporting the catalyst in an amount of about 50 g/l. The honeycomb catalyst structure had a catalyst layer of 26 μm in thickness. This catalyst is designated as Catalyst B-17.

EXAMPLE B-18 (Comparative)

An amount of 8.69 g of aluminum nitrate ($Al(NO_3)_3 \cdot 9H_2O$), 3.94 g of silver nitrate and 100 g of hydrated alumina (available from Mizusawa Kagaku Kogyo K.K.) in terms of γ-alumina were mixed with an appropriate amount of water to prepare a paste. The paste was kneaded and dried by use of a heating kneader, and then heated and calcined at 800° C. for three hours in an air atmosphere containing 10% by weight of moisture, thereby providing a γ-alumina powder catalyst supporting silver aluminate in an amount of 2.5% by weight in terms of silver based on the catalyst.

The γ-alumina powder catalyst was supported on the same honeycomb substrate of cordierite as in Example B-1 to provide a honeycomb catalyst structure supporting the catalyst in an amount of about 150 g/l. The honeycomb catalyst structure had a catalyst layer of 80 μm in thickness. This catalyst is designated as Catalyst B-18.

EXAMPLE B-19 (Comparative)

An amount of 8.69 g of aluminum nitrate ($Al(NO_3)_3 \cdot 9H_2O$), 3.94 g of silver nitrate, 0.50 g of ammonium molybdate and 100 g of hydrated alumina (available from Mizusawa Kagaku Kogyo K.K.) in terms of γ-alumina were mixed with an appropriate amount of water to prepare a paste. The paste was kneaded and dried by use of a heating kneader, and then heated and calcined at 800° C. for three hours in an air atmosphere containing 10% by weight of moisture, thereby providing a γ-alumina powder catalyst supporting molybdenum trioxide ($MoO_3$) in an amount of 0.1% by weight and silver aluminate in an amount of 2.5% by weight in terms of silver based on the catalyst.

The γ-alumina powder catalyst was supported on the same honeycomb substrate of cordierite as in Example B-1 to provide a honeycomb catalyst structure supporting the catalyst in an amount of about 150 g/l. The honeycomb catalyst structure had a catalyst layer of 80 μm in thickness. This catalyst is designated as Catalyst B-19.

(2) Performance Tests

Using the catalysts (B-1 to B-14) and the comparative catalysts (B-15 to B-19), a nitrogen oxide containing gas was reduced under the conditions below. The conversion rate of nitrogen oxides to nitrogen was determined by a chemical luminescence method.

Test Conditions (i) Gas Composition
  NO: 500 ppm
  $O_2$: 10% by volume
  Reducing agent: 500 ppm
  Water: 6% by volume
  Nitrogen: balance
(In the case gas oil was used as a reducing agent, it was deemed as a hydrocarbon of 12 carbons.)

(ii) Space Velocity: 25000 $hr^{-1}$ (iii) Reaction Temperature
  250° C., 300° C., 350° C., 400° C., 450° C. or 500° C.

The results are shown in Table 3.

Using the catalyst B-4 and the comparative catalyst B-16, a nitrogen oxide containing gas of which composition is shown below was first reduced at a temperature of 700° C. and at a space velocity of 25000 $hr^{-1}$ for a period of 500 hours, and then the nitrogen oxide containing gas was reduced under the conditions (ii) and (iii) above specified. The resistance to heat and sulfur oxides of the catalysts were evaluated. The results are shown in Table 4.

Gas Composition
  NO: 500 ppm
  $O_2$: 10% by volume
  Propylene: 500 ppm
  $SO_2$: 200 ppm
  Water: 6% by volume
  Nitrogen: balance

TABLE 3

| Catalyst | Reducing Agent | Nitrogen Oxide Conversion (%) | | | | | |
|---|---|---|---|---|---|---|---|
| | | 250° C. | 300° C. | 350° C. | 400° C. | 450° C. | 500° C. |
| B-1 | light oil | 34.7 | 47.3 | 71.0 | 58.4 | 49.2 | 31.2 |
| B-2 | light oil | 34.0 | 44.6 | 69.5 | 58.6 | 55.3 | 39.6 |
| B-3 | light oil | 27.2 | 41.8 | 69.1 | 59.7 | 57.7 | 41.0 |
| B-4 | light oil | 39.1 | 51.3 | 76.3 | 64.3 | 51.6 | 37.5 |
| | propylene | 39.2 | 66.4 | 79.9 | 74.3 | 62.4 | 45.8 |
| | propane | 32.3 | 59.7 | 73.8 | 76.2 | 71.8 | 49.4 |
| | ethanol | 52.1 | 81.2 | 93.9 | 86.0 | 47.9 | 19.8 |
| | acetaldehyde | 68.4 | 98.0 | 99.9 | 95.1 | 70.0 | 42.7 |
| | acetone | 38.8 | 54.3 | 65.1 | 43.8 | 21.3 | 5.4 |
| | ethyl acetate | 28.5 | 45.3 | 52.8 | 38.2 | 18.2 | 0.0 |
| B-5 | light oil | 38.9 | 50.1 | 63.4 | 49.6 | 34.4 | 20.6 |
| B-6 | light oil | 34.0 | 46.3 | 68.8 | 55.2 | 50.1 | 32.3 |
| B-7 | light oil | 38.7 | 50.0 | 73.1 | 58.0 | 50.0 | 32.6 |
| B-8 | light oil | 26.0 | 42.4 | 63.8 | 47.9 | 41.8 | 28.5 |
| B-9 | light oil | 18.3 | 34.0 | 56.0 | 43.5 | 39.9 | 24.2 |
| B-10 | light oil | 31.0 | 44.7 | 70.6 | 61.5 | 53.9 | 39.9 |
| B-11 | light oil | 43.0 | 54.8 | 68.7 | 56.5 | 43.8 | 30.0 |
| B-12 | light oil | 40.9 | 52.4 | 66.0 | 51.0 | 44.5 | 26.0 |
| B-13 | light oil | 41.7 | 55.8 | 72.9 | 59.2 | 47.4 | 31.6 |
| B-14 (Comparative) | light oil | 36.5 | 49.2 | 71.2 | 52.8 | 48.0 | 30.0 |
| B-15 | light oil | 14.9 | 15.8 | 12.7 | 5.3 | 0.0 | 0.0 |
| B-16 | light oil | 15.2 | 16.7 | 10.4 | 3.1 | 0.0 | 0.0 |
| B-17 | light oil | 16.8 | 31.5 | 42.6 | 43.5 | 34.8 | 25.1 |
| B-18 | light oil | 26.6 | 41.3 | 66.0 | 58.3 | 54.8 | 37.0 |
| B-19 | light oil | 34.3 | 44.5 | 46.3 | 38.9 | 26.4 | 0.0 |

TABLE 4

| Catalyst | Reducing Agent | Nitrogen Oxide Conversion (%) | | | | | |
|---|---|---|---|---|---|---|---|
| | | 250° C. | 300° C. | 350° C. | 400° C. | 450° C. | 500° C. |
| B-4 | light oil | 36.5 | 49.8 | 75.7 | 66.8 | 54.0 | 37.4 |
| (Comparative) B-16 | light oil | 3.6 | 8.4 | 14.2 | 15.9 | 25.0 | 39.8 |

As is apparent from Tables 3 and 4, the catalysts of the invention achieves a high conversion of nitrogen oxides, whereas the comparative catalysts have on the whole a low conversion rate of nitrogen oxides. In addition, the catalysts of the invention are durable when being used at high temperatures and excellent in resistance to sulfur oxides.

METHOD I

Preparation of First Catalysts

Preparation C-1

An amount of 8.69 g of aluminum nitrate (Al(NO$_3$)$_3$.9H$_2$O), 3.94 g of silver nitrate and 100 g of hydrated alumina (available from Mizusawa Kagaku Kogyo K.K.) were mixed with an appropriate amount of water to prepare a paste. The paste was kneaded and dried by use of a heating kneader, and then heated and calcined at 800° C. for three hours in an air atmosphere containing 10% by weight of moisture, thereby providing a γ-alumina powder catalyst supporting silver aluminate thereon in an amount of 2.5% by weight in terms of silver based on the catalyst.

Sixty grams of the γ-alumina powder catalyst were mixed with 6 g of silica sol (Snowtex N available from Nissan Kagaku Kogyo K.K.) and an appropriate amount of water. The mixture was ground with a planetary mill for five minutes using 100 g of zirconia balls as grinding media to prepare a wash coat slurry. A honeycomb substrate of cordierite having a cell number of 200 per square inch was coated with the slurry to provide a honeycomb catalyst structure supporting the catalyst in an amount of about 150 g/l. This catalyst is designated as Catalyst C-11.

Preparation of Second Catalysts

Preparation C-2

Sixty grams of silica-alumina having a specific surface area of 320 m$^2$/g (available from Fuji-Davidson Chemical) and 6 g of silica sol (Snowtex N available from Nissan Kagaku Kogyo K.K.) were mixed with and an appropriate amount of water. The mixture was ground with a planetary mill for five minutes using 100 g of alumina balls as grinding media to prepare a wash coat slurry. A honeycomb substrate of cordierite having a cell number of 100 per square inch was coated with the slurry, dried and then calcined at 300° C. for three hours to provide a honeycomb catalyst structure supporting the silica-alumina in an amount of about 200 g/l. This catalyst is designated as Catalyst C-21.

Preparation C-3

Zirconium hydroxide was calcined at 500° C. for three hours to prepare zirconia having a specific surface area of 80 m$^2$/g.

Sixty grams of the zirconia and 6 g of silica sol (Snowtex N available from Nissan Kagaku Kogyo K.K.) were mixed with and an appropriate amount of water. The mixture was ground with a planetary mill for five minutes using 100 g of alumina balls as grinding media to prepare a wash coat slurry. A honeycomb substrate of cordierite having a cell number of 400 per square inch was coated with the slurry, dried and then calcined at 300° C. for three hours to provide a honeycomb catalyst structure supporting the zirconia in an amount of about 200 g/l. This catalyst is designated as Catalyst C-22.

Preparation C-4

One kilogram of γ-alumina having a specific surface area of 150 m$^2$/g and 1 kg of polyethylene oxide were mixed with an appropriate amount of water. The mixture was extruded into a honeycomb structure having a cell number of 200 per square inch by use of an auger screw extruder. The honeycomb structure was air-dried at normal temperatures, dried at 100° C. overnight, and then calcined at 500° C. for three hours to prepare a γ-alumina honeycomb catalyst structure. This catalyst is designated as Catalyst C-23.

Preparation C-5

Metatitanic acid (TiO$_2$.2H$_2$O) was calcined at 500° C. for three hours to prepare titania having a specific surface area of 120 m$^2$/g.

Sixty grams of the titania and 6 g of silica sol (Snowtex N available from Nissan Kagaku Kogyo K.K.) were mixed with an appropriate amount of water. In the same manner as in Example C-3, a wash coat slurry was prepared, and by use thereof a honeycomb catalyst structure supporting the titania in an amount of about 200 g/l was prepared. This catalyst is designated as Catalyst C-24.

Performance Tests

EXAMPLES C-1 to C-4

Using the catalysts (C-11) as the first catalyst and the catalysts (C-21 to C-24) as the second catalyst, a nitrogen oxide-containing gas was reduced under the conditions below. The conversion of nitrogen oxides to nitrogen was determined by gas chromatography based on the amount of nitrogen formed. That is, the conversion was calculated based on a formula: (nitrogen gas (ppm) in the exhaust gas after reduction treatment/nitrogen oxides (ppm) in the exhaust gas before reduction treatment)×100 (%).

The concentrations of the ammonia and hydrogen cyanide formed in the reduction treatment of the exhaust gas were detected by use of a Kitagawa gas detector, and the formation rate was determined by a formula: (concentration (ppm) of ammonia or hydrogen cyanide in the exhaust gas after reduction treatment/concentration (ppm) of nitrogen gas (ppm) in the exhaust gas before reduction treatment)×100 (%). The results are shown in Tables 5 and 6.

Test Conditions (i) Gas Composition

NO: 500 ppm

O$_2$: 10% by volume

Reducing agent: 500 ppm

Water: 6% by volume

SO$_2$: 20 ppm

Helium: balance (In the case gas oil was used as a reducing agent, it was deemed as a hydrocarbon of 12 carbons.)

(ii) Space Velocity

First step: 20000 hr$^{-1}$

Second step: 20000 hr$^{-1}$ (iii) Reaction Temperature

250° C., 300° C., 350° C., 400° C., 450° C., 500° C. or 550° C.

EXAMPLES C-5 and C-6 (Comparative)

The same nitrogen oxide-containing gas as used in Examples C-1 to C-4 was reduced under the same conditions as in Examples C-1 to C-4 except that either the first or the second catalyst was used. The results are shown in Tables 5 and 6.

TABLE 5

| | Reducing Agent | Catalyst | Nitrogen Oxide Conversion (%) | | | | | | |
|---|---|---|---|---|---|---|---|---|---|
| | | | 250° C. | 300° C. | 350° C. | 400° C. | 450° C. | 500° C. | 550° C. |
| Example C-1 | light oil | C-11<br>C-21 | 12.0 | 21.2 | 30.4 | 59.2 | 61.0 | 62.7 | 54.1 |
| Example C-2 | light oil | C-11<br>C-22 | 18.8 | 24.9 | 34.3 | 61.3 | 65.4 | 61.5 | 50.5 |
| Example C-3 | light oil | C-11<br>C-23 | 19.6 | 27.1 | 41.4 | 66.1 | 73.5 | 66.2 | 55.5 |
| Example C-4 | propylene | C-11<br>C-23 | 10.9 | 22.3 | 42.4 | 54.8 | 61.2 | 55.3 | 49.4 |
| (Comparative) Example C-5 | light oil | C-11 | 7.1 | 17.8 | 26.6 | 30.2 | 47.9 | 40.1 | 38.4 |
| (Comparative) Example C-6 | light oil | C-23 | 0.0 | 0.0 | 4.4 | 18.9 | 29.2 | 30.4 | 43.7 |

Notes:
In the column of Catalyst, the upper is a first catalyst and the lower is a second catalyst.

TABLE 6

| | Nitrogen-containing Compound | Formation Rate of Ammonia or Hydrogen Cyanide (%) | | | | | | |
|---|---|---|---|---|---|---|---|---|
| | | 250° C. | 300° C. | 350° C. | 400° C. | 450° C. | 500° C. | 550° C. |
| Example C-1 | ammonia | 2 | 3 | 0 | 0 | 0 | 0 | 0 |
| | hydrogen cyanide | 2 | 4 | 0 | 0 | 0 | 0 | 0 |
| Example C-2 | ammonia | 2 | 0 | 0 | 0 | 0 | 0 | 0 |
| | hydrogen cyanide | 1 | 0 | 0 | 0 | 0 | 0 | 0 |
| Example C-3 | ammonia | 2 | 0 | 0 | 0 | 0 | 0 | 0 |
| | hydrogen cyanide | 1 | 0 | 0 | 0 | 0 | 0 | 0 |
| Example C-4 | ammonia | 0 | 0 | 0 | 0 | 0 | 0 | 0 |
| | hydrogen cyanide | 0 | 0 | 0 | 0 | 0 | 0 | 0 |
| Example C-5 (Comparative) | ammonia | 5 | 6 | 10 | 20 | 14 | 13 | 7 |
| | hydrogen cyanide | 3 | 4 | 8 | 12 | 11 | 9 | 5 |

As is apparent from Tables 5 and 6, the method of the invention achieves higher nitrogen oxide conversion if either gas oil or propylene is used as a reducing agent than the comparative method wherein the second catalyst alone is used.

In addition, according to the method of the invention, nitrogen oxides in exhaust gases are efficiently reduced by use of a reduced amount of a reducing agent and without undesirable by-production of toxic nitrogen-containing compounds such as ammonia, amines or hydrogen cyanide.

METHOD II
Preparation of First Catalysts
Preparation D-1

Sixty grams of powder of γ-alumina pellets (KHA-24 available from Sumitomo Kagaku Kogyo K.K.) and 6 g of alumina sol (available from Nissan Kagaku Kogyo K.K.) were mixed with an appropriate amount of water. The mixture was ground with a planetary mill for five minutes using 100 g of zirconia balls as grinding media to prepare a wash coat slurry. A honeycomb substrate of cordierite having a cell number of 400 per square inch was coated with the slurry to provide a honeycomb structure supporting the γ-alumina in an amount of about 170 g/l.

An amount of 3.6 g of an aqueous phosphoric acid solution (85% by weight concentration) was dissolved in ion-exchanged water to prepare a solution in an amount of 30 ml. The honeycomb structure was immersed in the solution to impregnate the honeycomb structure with the phosphoric acid.

The honeycomb structure was taken out of the solution and excess solution adhering to the structure was removed. The honeycomb structure was then dried at 100° C. for 12 hours, followed by calcining at 500° C. in air, thereby providing a honeycomb catalyst structure supporting the γ-alumina catalyst composed of γ-alumina which supported phosphoric acid in an amount of 2.0% by weight based on the γ-alumina catalyst. This catalyst is designated as Catalyst D-11.

Preparation D-2

An amount of 2.10 g of nickel chloride ($NiCl_3$) was dissolved in ion-exchanged water to prepare a solution in an amount of 30 ml. In the same manner as in Example D-1, there was prepared a honeycomb catalyst structure supporting a γ-alumina catalyst composed of γ-alumina which supported nickel chloride in an amount of 2.0% by weight in terms of nickel based on the γ-alumina catalyst. This catalyst is designated as Catalyst D-12.

Preparation D-3

An amount of 4.33 g of nickel sulfate ($NiSO_4.6H_2O$) was dissolved in ion-exchanged water to prepare a solution in an amount of 30 ml. In the same manner as in Example D-1, there was prepared a honeycomb catalyst structure supporting a γ-alumina catalyst composed of γ-alumina which supported nickel sulfate in an amount of 2.0% by weight in terms of nickel based on the γ-alumina catalyst. This catalyst is designated as Catalyst D-13.

Preparation D-4

An amount of 10.83 g of nickel sulfate ($NiSO_4.6H_2O$) was dissolved in ion-exchanged water to prepare a solution in an amount of 30 ml. In the same manner as in Example D-1, there was prepared a honeycomb catalyst structure supporting a γ-alumina catalyst composed of γ-alumina which supported nickel sulfate in an amount of 5.0% by weight in terms of nickel based on the γ-alumina catalyst. This catalyst is designated as Catalyst D-14.

Preparation D-5

An amount of 0.43 g of nickel sulfate ($NiSO_4 \cdot 6H_2O$) was dissolved in ion-exchanged water to prepare a solution in an amount of 30 ml. In the same manner as in Example D-1, there was prepared a honeycomb catalyst structure supporting a γ-alumina catalyst composed of γ-alumina which supported nickel sulfate in an amount of 0.2% by weight in terms of nickel based on the γ-alumina catalyst. This catalyst is designated as Catalyst D-15.

Preparation D-6

An amount of 4.24 g of manganese sulfate ($MnSO_4 \cdot 5H_2O$) was dissolved in ion-exchanged water to prepare a solution in an amount of 30 ml. In the same manner as in Example D-1, there was prepared a honeycomb catalyst structure supporting a γ-alumina catalyst composed of γ-alumina which supported manganese sulfate in an amount of 2.0% by weight in terms of manganese based on the γ-alumina catalyst. This catalyst is designated as Catalyst D-16.

Preparation D-7

An amount of 1.52 g of silver nitrate ($AgNO_3$) was dissolved in ion-exchanged water to prepare a solution in an amount of 30 ml. In the same manner as in Example D-1, there was prepared a honeycomb structure supporting a catalyst composed of γ-alumina supporting silver nitrate in an amount of 2.0% by weight in terms of silver based on the catalyst. The resulting honeycomb structure was then immersed in a 1% by weight aqueous hydrochloric acid solution to convert the silver nitrate to silver chloride, thereby providing a honeycomb catalyst structure supporting a γ-alumina catalyst composed of γ-alumina which supported silver chloride in an amount of 2.0% by weight in terms of silver based on the γ-alumina catalyst. This catalyst is designated as Catalyst D-17.

Preparation D-8

An amount of 3.06 g of silver phosphate ($Ag_3PO_4$) was dissolved in a 10% by weight aqueous solution of phosphoric acid to prepare a solution in an amount of 30 ml. The same honeycomb structure of cordierite supporting γ-alumina thereon was immersed in the solution to impregnate the honeycomb structure with the silver phosphate.

The honeycomb structure was taken out of the solution and excess solution adhering to the structure was removed. The honeycomb structure was then dried at 100° C. for 12 hours, followed by calcining at 500° C. in air, thereby providing a honeycomb structure supporting a γ-alumina catalyst composed of γ-alumina which supported silver phosphate in an amount of 2.0% by weight in terms of silver based on the γ-alumina catalyst. This catalyst is designated as Catalyst D-18.

Preparation of Second Catalysts

Preparation D-9

An amount of 8.69 g of aluminum nitrate ($Al(NO_3)_3 \cdot 9H_2O$), 3.94 g of silver nitrate and 100 g of hydrated alumina (available from Mizusawa Kagaku Kogyo K.K.) were mixed with an appropriate amount of water to prepare a paste. The paste was kneaded and dried by use of a heating kneader, and then heated and calcined at 800° C. for three hours in an air atmosphere containing 10% by weight of moisture, thereby providing a γ-alumina powder catalyst supporting silver aluminate thereon in an amount of 2.5% by weight in terms of silver based on the catalyst.

Sixty grams of the γ-alumina powder catalyst and 6 g of silica sol (Snowtex N available from Nissan Kagaku Kogyo K.K.) were mixed with an appropriate amount of water. The mixture was ground with a planetary mill for five minutes using 100 g of zirconia balls as grinding media to prepare a wash coat slurry. A honeycomb substrate of cordierite having a cell number of 200 per square inch was coated with the slurry to provide a honeycomb catalyst structure supporting the catalyst in an amount of about 150 g/l. This catalyst is designated as Catalyst D-21.

Performance Tests

EXAMPLES D-1 to D-9

Using the catalysts (D-11 to D-18) as the first catalyst and the catalysts (D-21) as the second catalyst, a nitrogen oxide-containing gas was reduced under the conditions below. The conversion of nitrogen oxides to nitrogen was determined by a chemical luminescence method. The results are shown in Table 7.

Test Conditions (i) Gas Composition
CO: 1000 ppm
$H_2$: 1000 ppm
Hydrocarbon: 500 ppm
$O_2$: 10% by volume
$SO_2$: 200 ppm
Water: 6% by volume
Nitrogen: balance (ii) Space Velocity
First step: 50000 $hr^{-1}$
Second step: 50000 $hr^{-1}$ (iii) Reaction Temperature
300° C., 350° C., 400° C., 450° C. or 500° C.

EXAMPLES D-10 and D-11 (Comparative)

The same nitrogen oxide-containing gas as used in Examples D-1 to D-9 was reduced under the same conditions as in Examples D-1 to D-9 except that either the first or the second catalyst alone was used. The results are shown in Table 7.

The use of the first catalyst only results in very low conversion of nitrogen oxides. The use of the second catalyst only also results in generally low conversion of nitrogen oxides throughout the reaction temperatures tested.

TABLE 7

| | Reducing Agent | Catalyst | Space Velocity ($hr^{-1}$) | Nitrogen Oxide Conversion (%) | | | | |
|---|---|---|---|---|---|---|---|---|
| | | | | 300° C. | 350° C. | 400° C. | 450° C. | 500° C. |
| Example D-1 | light oil | D-11 | 50000 | 33.8 | 47.7 | 59.5 | 51.1 | 42.0 |
| | | D-21 | 50000 | | | | | |
| Example D-2 | light oil | D-12 | 50000 | 39.8 | 54.0 | 50.9 | 44.0 | 37.6 |
| | | D-22 | 50000 | | | | | |
| Example D-3 | light oil | D-13 | 50000 | 42.9 | 58.1 | 67.5 | 61.3 | 46.7 |

TABLE 7-continued

|  | Reducing Agent | Catalyst | Space Velocity (hr⁻¹) | Nitrogen Oxide Conversion (%) | | | | |
|---|---|---|---|---|---|---|---|---|
|  |  |  |  | 300° C. | 350° C. | 400° C. | 450° C. | 500° C. |
| Example D-4 | light oil | D-21<br>D-14<br>D-21 | 50000<br>50000<br>50000 | 48.4 | 56.2 | 53.8 | 48.5 | 33.8 |
| Example D-5 | light oil | D-15<br>D-21 | 50000<br>50000 | 38.4 | 47.5 | 54.9 | 50.1 | 45.5 |
| Example D-6 | light oil | D-12<br>D-21 | 50000<br>50000 | 26.2 | 42.8 | 57.8 | 61.7 | 53.2 |
| Example D-7 | light oil | D-16<br>D-21 | 50000<br>50000 | 47.9 | 55.6 | 44.3 | 39.0 | 31.2 |
| Example D-8 | light oil | D-17<br>D-21 | 50000<br>50000 | 48.2 | 67.4 | 58.1 | 37.9 | 21.5 |
| Example D-9 | light oil | D-11<br>D-21 | 50000<br>50000 | 22.0 | 33.4 | 40.5 | 33.2 | 27.7 |
| Example D-10 (Comparative) | light oil | D-21 | 50000 | 3.6 | 7.5 | 18.3 | 34.3 | 34.3 |
| Example D-11 (Comparative) | light oil | D-11 | 50000 | 0.0 | 0.0 | 6.5 | 12.2 | 19.9 |

Notes:
In the column of Catalyst, the upper is a first catalyst and the lower is a second catalyst.
In the column of Space Velocity, the upper is the first step and the lower is the second step.

As is apparent from Table 7, the method of the invention makes it possible to catalytically reduce nitrogen oxides in exhaust gases in a stable and efficient manner even in the presence of oxygen, sulfur oxides or moisture, with the use of a reducing agent in a reduced molar ratio of the reducing agent to nitrogen oxides.

What is claimed is:

1. A method for catalytic reduction of nitrogen oxides contained in exhaust gases which comprises contacting the exhaust gas with a catalyst under conditions effective for the reduction of nitrogen oxides, which comprises silver aluminate supported on alumina, wherein the catalyst is produced by supporting at least one member selected from the group consisting of silver, silver halides, silver nitrate, silver hydroxide and silver oxide on alumina, and then calcining the resultant product in an oxidative atmosphere in the presence of 3–20% by weight of water vapor at a temperature of 600–900° C. to form silver aluminate on the alumina, wherein the silver aluminate is supported in an amount of 0.01–10% by weight based on the catalyst.

2. The method as claimed in claim 1, wherein the resultant produce is calcined at a temperature of 700–900° C.

3. The method as claimed in claim 1, wherein the silver halide is silver chloride.

4. A method for catalytic reduction of nitrogen oxides contained in exhaust gases which comprises contacting the exhaust gas with a catalyst under conditions effective for the reduction of nitrogen oxides, which comprises silver aluminate and at least one transition element selected from the group consisting of W, Mo and V, each supported on alumina, wherein the catalyst is produced by preparing an aqueous solution of a water soluble aluminum salt, a water soluble silver salt and a water soluble compound of the transition element, immersing alumina in the solution to impregnate the alumina with the aluminum salt, the silver salt and the compound of the transition element, and drying and calcining the resultant product in an oxidative atmosphere in the presence of 3–20% by weight of water vapor at a temperature of 600–900° C. so that silver aluminate is formed on the alumina, and wherein the silver aluminate is contained in an amount of 0.01–10% by weight in terms of silver and said at least one transition element in an amount of 0.0001–0.2% by weight, each based on the catalyst.

5. The method as claimed in claim 4, wherein the water soluble aluminum salt and the water soluble silver salt are nitrates.

6. The method as claimed in claim 4, wherein the resultant product is calcined at a temperature of 700–900° C.

7. A method for catalytic reduction of nitrogen oxides contained in exhaust gases which comprises:

a first step in which the exhaust gas is contacted with a first catalyst which comprises silver aluminate supported on alumina in the presence of a hydrocarbon as a reducing agent; and a second step in which the exhaust gas is contacted with a second catalyst which comprises at least one of alumina, silica-alumina, zirconia and titania, said contact in said first and second steps being under conditions effective for the reduction of nitrogen oxides, wherein the first catalyst is produced by supporting at least one member selected from the group consisting of silver, silver halides, silver nitrate, silver hydroxide and silver oxide on alumina, and then calcining the resultant product in an oxidative atmosphere in the presence of 3–20% by weight of water vapor at a temperature of 600–900° C. to form silver aluminate on the alumina, and wherein the silver aluminate is supported in an amount of 0.01–10% by weight based on the catalyst.

8. The method as claimed in claim 7, wherein the resultant product is calcined at a temperature of 700–900° C.

9. The method as claimed in claim 7, wherein the silver halide is silver chloride.

10. The method as claimed in claim 7, wherein the exhaust gas is contacted with the first catalyst in the first step at a temperature of 250–550° C. in the presence of a hydrocarbon in an amount of 0.1–2 mols per mol of the nitrogen oxides, and the exhaust gas is then contacted with the second catalyst in the second step at a temperature of 250–550° C.

11. A method for catalytic reduction of nitrogen oxides contained in exhaust gases which comprises:

a first step in which the exhaust gas is contacted with a first catalyst which comprises at least one member selected from the group consisting of phosphoric acid, phosphates, chlorides and sulfates of the Ib elements, VIIa elements and VIII elements of the Periodic Table; and a second step in which the exhaust gas is contacted with a second catalyst which comprises silver aluminate supported on alumina, said contact in said first and second steps being performed under conditions effective for the reduction of nitrogen oxides, wherein the second catalyst is produced by supporting at least one member selected from the group consisting of silver, silver halides, silver nitrate, silver hydroxide and silver oxide on alumina, and then calcining the resultant product in an oxidative atmosphere in the presence of water vapor at a temperature of 600–900° C. to form silver aluminate on the alumina, and wherein the silver aluminate is supported in an amount of 0.01–10% by weight based on the catalyst.

12. The method as claimed in claim 11, wherein the resultant produce is calcined at a temperature of 700–900° C.

13. The method as claimed in claim 11, wherein the silver halide is silver chloride.

14. The method as claimed in claim 11, wherein the first catalyst comprises said at least one member supported on a carrier material in an amount of 0.05–5% by weight.

15. The method as claimed in claim 11, wherein the exhaust gas is contacted with the first catalyst in the first step at a temperature of 150–600° C. in the presence of a hydrocarbon in an amount of 0.1–5 mols per mol of the nitrogen oxides, and the exhaust gas is then contacted with the second catalyst in the second step at a temperature of 150–600° C.

16. The method as claimed in claim 11, wherein the exhaust gas is contacted with the first catalyst in the first step at a temperature of 250–550° C. in the presence of a hydrocarbon in an amount of 0.1–2 mols per mol of the nitrogen oxides, and the exhaust gas is then contacted with the second catalyst in the second step at a temperature of 250–550° C.

17. The method as claimed in claim 11, wherein the phosphates, chlorides and sulfates of the Ib elements, VIIIa elements and VIII elements of the Periodic Table are silver phosphate, copper phosphate, manganese phosphate, iron phosphate, cobalt phosphate, nickel phosphate, silver chloride, copper chloride, manganese chloride, iron chloride, cobalt chloride, nickel chloride, silver sulfate, copper sulfate, iron sulfate, manganese sulfate, cobalt sulfate and nickel sulfate.

* * * * *